United States Patent
Mizutani et al.

(10) Patent No.: US 7,225,986 B2
(45) Date of Patent: Jun. 5, 2007

(54) IMAGE READING SYSTEM

(75) Inventors: Yasushi Mizutani, Tokyo (JP); Tomomi Sawano, Tokyo (JP); Yasuo Koshizuka, Tokyo (JP); Tatsuya Miyakawa, Tokyo (JP); Makoto Sasaki, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 518 days.

(21) Appl. No.: 10/794,674

(22) Filed: Mar. 5, 2004

(65) Prior Publication Data

US 2004/0184027 A1    Sep. 23, 2004

(30) Foreign Application Priority Data

Mar. 5, 2003    (JP)    .............................. 2003-058005

(51) Int. Cl.
G06K 7/10    (2006.01)
G06K 7/14    (2006.01)

(52) U.S. Cl. ....................... 235/454; 235/435

(58) Field of Classification Search ................ 235/454; 382/115, 121
See application file for complete search history.

(56) References Cited

U.S. PATENT DOCUMENTS

| 5,088,817 | A |   | 2/1992 | Igaki et al. |
| 5,635,723 | A | * | 6/1997 | Fujieda et al. ............... 250/556 |
| 6,414,297 | B1 |  | 7/2002 | Sasaki |
| 6,681,992 | B2 |  | 1/2004 | Iihama |

FOREIGN PATENT DOCUMENTS

| CN | 1256773 A | 6/2000 |
| JP | 2002-279412 A | 9/2002 |
| KR | 1993-0002346 B1 | 3/1993 |
| KR | 2001-0107545 A | 12/2001 |
| KR | 2002-0011884 A | 2/2002 |
| WO | WO 01/45283 A1 | 6/2001 |

* cited by examiner

Primary Examiner—Lisa M. Caputo
(74) Attorney, Agent, or Firm—Frishauf, Holtz, Goodman & Chick, P.C.

(57) ABSTRACT

An image reading system which reads the images of a detectable object comprising an image display device that has an image display area to display images having luminosity corresponding to the display gradation and radiates the display illumination according to this luminosity; a detection surface in which the entire image display area of the image display device is covered with a laminated layer arrangement and a detectable object is placed; an image reading device comprising a first sub-area in the detection surface on which the detectable object is placed and a second sub-area which consists of an area corresponding to at least a portion of the area of the image display area except for the first sub-area; and a plurality of photosensors arranged in a matrix form provided in the first sub-area and second sub-area which has uniform transmittance, wherein at least a portion of the display illumination is permeated and the image of the detectable object is read in the first sub-area. While being able to read a detectable object image adequately, the image display can be performed satisfactorily.

38 Claims, 14 Drawing Sheets

A-A ARROW VIEW

IMAGE READING SYSTEM

CROSS-REFERENCE TO RELATED APPLICATION

This application is based upon and claims the benefit of priority from the prior Japanese Patent Application No. 2003-058005, filed Mar. 5, 2003, the entire contents of which is incorporated herein by reference.

BACKGROUND OF THE INVENTION

1. Field of the Invention

This invention relates to an image reading system, and more particularly related to an image reading system comprising an image display function in addition to an image reading feature which can be mounted satisfactorily in small electronic devices, such as portable devices and the like. Furthermore, this image reading system is applied by the user and relates to a personal authentication system which performs authentication of the person themselves.

2. Description of the Related Art

Conventionally, an image reading device which reads detailed irregular patterns and shapes, such as a fingerprint and the like, is known. The device structure of semiconductor types, those similar to electrostatic capacity reading types, reads detectable object images, such as a fingerprint, which are classified broadly by detecting electrostatic capacity based on the difference of potential produced between a detectable object (finger) and the detection sensors. A detectable object image is captured through an optical system, such as a prism, mirror or the like, and the optical device structure reads the light and dark information with photosensors arranged in a matrix form, such as in Charged-Coupled Device (CCD) or Complementary Metal Oxide Semiconductor (CMOS) sensors. With such an image reading device, an individual can be identified by comparing biological characteristic information, such as a fingerprint, and application to the termed field of "personal authentication technology" research is being extensively studied and developed.

In the device structure of the semiconductor type mentioned above, a detectable object is placed on the reading detection area which reads the detectable object image. Although the device has a benefit that it can be formed very thin and lightweight using semiconductor manufacturing technology, it has a disadvantage of being susceptible to generating static electricity damage in the detection sensor by a static electricity charge from the detectable object.

On the other hand, in an optical device structure, since an optical system intervenes between the detectable object and the photosensor, although not suitable for neither thin shaping nor weight saving, as an electrical connection state does not physically exist between both sides it is difficult to generate static electricity damage of the photosensor by the static electricity charge from the detectable object and has a benefit that the reading speed response of a fingerprint is also relatively quick.

Incidentally, in recent years the spread of portable electronic devices, such as cellular/mobile phones, notebook personal computers, Personal Digital Assistants (PDA) and the like has been remarkable. While such electronic devices are a convenience which promote communication via voice, electronic mail and the like freely or a person can move around with lot of information, these devices have the risk that personal information may be disclosed or important confidential information may be stolen. For that reason, in order to prevent disclosure and theft of such various kinds of information and to restrict access to the information concerned, in the aforementioned electronic devices there is growing public desire for mounting a personal authentication system for identifying and authenticating an individual person in the unit itself.

Here, although Charged-Coupled Device (CCD) or Complementary Metal Oxide Semiconductor (CMOS) sensors are used abundantly as photosensors for image reading devices which have an optical device mentioned above, such photosensors have a configuration formed on a semiconductor substrate as is well-known and not able to permeate light. Accordingly, when an image reading device using photosensors in the electronic device is designed and mounted with a personal authentication system, the photosensors have to be formed in a portion of the housing and the supplementary display has to be formed in another location.

However, when it is considered in as such an electronic device configuration, particularly a small portable electronic device, the size of the electronic device increased and there exists a problem in constraining the portability of a carriable electronic device. Conversely, although the size of an image reading device can be reduced to control enlargement of the overall size of the electronic device, but it then becomes difficult to read detectable object images, such as a fingerprint, satisfactorily. Therefore, there exists a problem in that stabilized personal authentication can not be performed.

SUMMARY OF THE INVENTION

The present invention has been made in view of the circumstances mentioned above. Accordingly, it is the primary object of the present invention to provide an image reading system which reads the image of a detectable object and the detectable object image can be read satisfactorily. In the personal authentication system applied to this image reading system, while being able to perform an individual authentication process satisfactorily, the present invention has an advantage to achieve favorable improvement of the display quality in the image display.

The image reading system in the present invention for acquiring the above-mentioned advantage comprises an image display device which has an image display area to display images having luminosity corresponding to the display gradation and radiates the display illumination according to this luminosity; an image reading device arranged on the image display area of the image display device and the entire image display area is at least covered with a laminated layer arrangement comprising a detection surface on which a detectable object is placed; a first sub-area in the detection surface on which the detectable object is placed and a second sub-area which consists of an area corresponding to at least a portion of the image display area except for the first sub-area; and a plurality of photosensors arranged in a matrix form provided in the first sub-area and second sub-area which have permeability, wherein at least a portion of the display illumination radiated from the image display area is permeated and the image of the detectable object is read in the first sub-area.

According to the present invention, in the image reading device at least a portion of the light of the display illumination permeated by the photosensors is irradiated by the detectable object placed on the detection surface and reflected by the detectable object and read as the detectable object image. Also, in the image reading device, the plurality of photosensors are the first photosensors provided in the first sub-area of the detection surface and the second photosensors provided in the second sub-area of the detection surface, wherein the first photosensors and the second photosensors have the same structure and the same array interval. Moreover, the image reading device has a driver circuit which applies predetermined signal voltage to a plurality of photosensors, wherein the driver circuit applies and drives the predetermined signal voltage to only the first photosensors in the first sub-area of the detection surface and the fingerprint image of a finger is read as the detectable object.

According to the present invention, the image display device comprising a luminescent device which has an area corresponding to at least the image display area and has a luminescent surface side which radiates light in predetermined luminosity; and a transmissive display panel which is placed on the luminescent surface of the luminescent device and the image display area of the image display device is arranged with a plurality of display pixels formed in a matrix form whereby at least a portion of the light radiated from the luminescent surface of the luminescent device in the image display area is permeated and radiates as the display illumination; or comprises a self-luminescence type display panel, wherein the image display area a plurality of display pixels arranged and formed in a matrix form have luminescent pixels which radiate the display illumination in the luminescent luminosity responsive to the display gradation. Additionally, the image display device comprises a means which sets the luminosity of the area corresponding to at least the first sub-area in the image display area at luminosity suitable for reading the detectable object image in the photosensor array.

According to the present invention, further the image display device comprises a third sub-area which includes a wiring area where only a plurality of electrical wires are connected to the photosensors in the first sub-area that is composed of an area except for the first sub-area and the second sub-area arranged in the detection surface. Also, the image display device comprises a luminosity setting means which sets low luminosity in the area corresponding to at least the third sub-area in the detection surface of the image display area to the luminosity of the area corresponding to the first sub-area and the second sub-area. In order to acquire the above-mentioned advantage, the method of operation in the case of reading the image of the detectable object placed on the detection surface with the image reading system in the present invention comprises a step which receives light that is at least a portion of the display illumination light permeated by the photosensors and is irradiated by the detectable object placed on the detection surface and is reflected by the detectable object with the photosensors of the first sub-area of the detection surface; and a step which reads the image of the detectable object as light and dark information based on the luminosity intensity distribution received by the photosensors. Additionally, the drive method further comprises a step which sets the luminosity of the area corresponding to at least the first sub-area of the image display area at a luminosity suitable for reading the photographic image, and a step which performs the display for guiding the placement of the detectable object to the first sub-area of the detection surface in the image display area of the image display device.

Furthermore, the method of operation in the case of displaying an image through the image reading device comprises a step which sets each photosensor in the image reading device as a non-operating state, and a step which applies the signal voltage according to the display gradation to each display pixel in the image display area of the image display device and displays the image.

The personal authentication system in the present invention for acquiring the above-mentioned advantage comprises an image display device which has an image display area to display images having luminosity corresponding to the display gradation and radiates the display illumination according to this luminosity; an image reading system which comprises an image reading device comprising a detection surface on which a detectable object is placed, wherein the entire image display area of the image display device is at least covered with a laminated layer arrangement and at least a portion of the display illumination is permeated; a plurality of photosensors are provided in a first sub-area in the detection surface on which the detectable object is placed and a second sub-area which consists of an area corresponding to at least a portion of the image display area except for the first sub-area; and the photographic image of the detectable object is read in the first sub-area; a communication means having a means which transmits at least the light and dark information on the detectable object read by the image reading device to an authenticating means through a predetermined telecommunication circuit network, and a means which receives the result of the authentication process whereby the registration information previously recorded by the authenticating means and the light and dark information are compared through a telecommunication circuit network; and a means which displays at least the result of the authentication process with the image display device.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

Hereinafter, the image reading system and image reading system drive method will be explained in detail based on the embodiments shown in the accompanying drawings.

First, the configuration of the photosensor favorably applicable to the image reading device of the image reading system related to this invention will be explained.

<<Double-Gate Type Photosensor>>

Figure 1A:
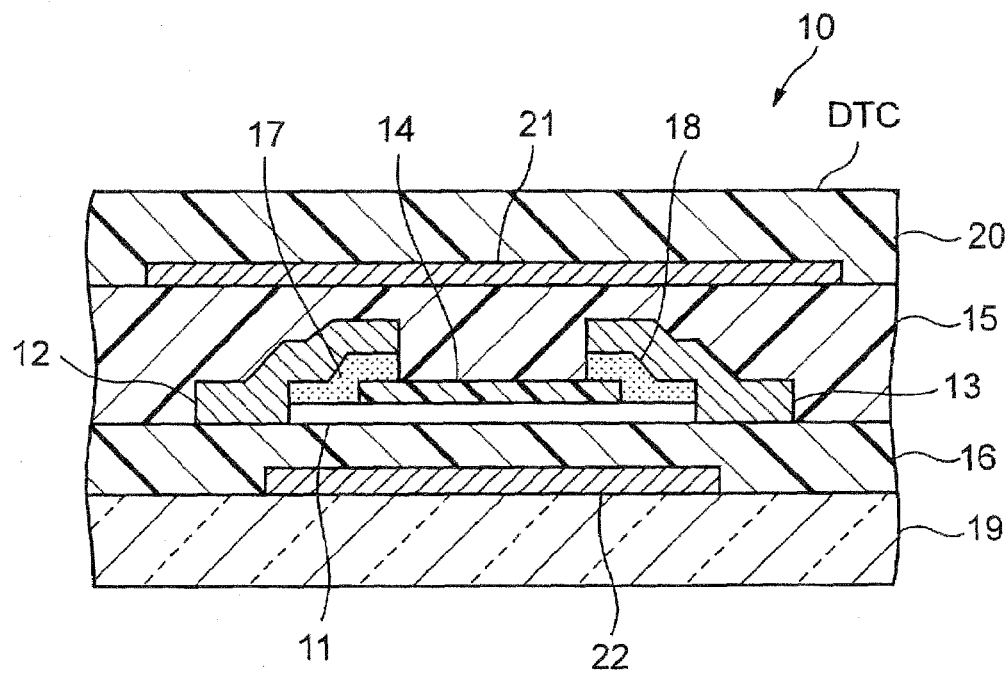
FIGS. 1A and 1B show a cross-sectional structural drawing of the photosensor applicable to the image reading device in the image reading system related to present invention and an equivalent circuit.
Figure 1B:
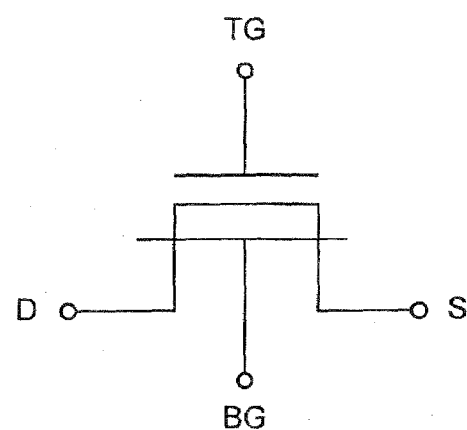

FIGS. 1A and 1B show a cross-sectional structural drawing of the photosensor applicable to the image reading device in the image reading system related to present invention and an equivalent circuit.

The photosensor applicable to the image reading device in the image reading system related to this invention, for example as shown in FIG. 1A, is constituted by a double-gate type photosensor 10 with double-gate type transistor. The double-gate type photosensor 10, a semiconductor layer (channel region) 11, the impurity layers 17 and 18, a drain electrode 12, a source electrode 13, a top gate electrode (first gate electrode) 21, a blocking insulator layer 14, a gate insulator layer 15, a supplementary insulation film 20, a bottom gate electrode (second gate electrode) 22 and a gate insulator layer 16. Briefly, the double-gate type photosensor 10 is applied for incidence of excitation light (in this case, visible light) occurs; the semiconductor layer (channel region) 11, such as amorphous silicon and the like, by which an electron hole pair is generated; the opaque drain electrode 12 and the source electrode 13 opposed to visible light are formed at both ends of the semiconductor layer 11 via the impurity layers 17 and 18 which are each composed of n+ silicon consisting of a conducting material selected from chromium, a chromium alloy, aluminum, an aluminum alloy and the like; the top gate electrode (first gate electrode) 21 which shows permeability to visible light is composed of transparent electrode layers such as tin oxide film, Indium Tin Oxide (ITO) film (Indium-stannic acidified film) formed above the semiconductor layer 11 (drawing upper part) via the blocking insulator layer 14 and upper section (top) gate insulator layer 15; the supplementary insulation film 20 formed on the top gate electrode 21; and the bottom gate electrode (second gate electrode) 22 opaque to visible light composed of a conducting material selected from chromium, such as a chromium alloy, aluminum, an aluminum alloy and the like formed below the semiconductor layer 11 (drawing lower part) via the lower section (bottom) gate insulator layer 16.

The double-gate type photosensor 10 which has such a configuration is formed on a transparent insulating substrate 19, such as an insulating glass substrate as shown in FIG. 1A. Also, as described later, the supplementary insulation film 20 is constructed so that a detectable object may be placed on this surface. The upper surface of the supplementary insulation film 20 constitutes a detection surface DTC.

Here, in FIG. 1A, the insulator layer which constitutes the top gate insulator layer 15, the blocking insulator layer 14, the bottom gate insulator layer 16 and the supplementary insulation film 20 provided above the top gate electrode 21 are composed of materials which have high-transmittance to visible light that excite the semiconductor layer 11, for example, silicon nitride, silicon oxide and the like. Accordingly, at least a portion of the light irradiated from the illuminant and the like provided in the lower part of the insulating substrate 19 described later permeates each of the insulator layers 19, 16, 15 and 20 and radiated to the upper part from the detection surface DTC of the supplementary insulation film 20 upper surface. Also, the light radiated from the detection surface DTC is irradiated by the detectable object placed on the detection surface DTC and has a structure in which it is reflected by that detectable object. The reflected light carries out incidence to the semiconductor layer 11 of the double-gate type photosensor 10 via each of the insulator layers 20, 15, 14 and the top gate electrode 21.

Such a double-gate type photosensor 10 is a transistor which has two gate electrodes essentially and generally expressed by the equivalent circuit as shown in FIG. 1B. Here, TG is the top gate terminal electrically connected to the top gate electrode 21; BG is the bottom gate terminal electrically connected to the bottom gate electrode 22; S is the source terminal electrically connected to the source electrode 13; and D is the drain terminal electrically connected to the drain electrode 12.

<<Image Reading Device>>

Figure 2:
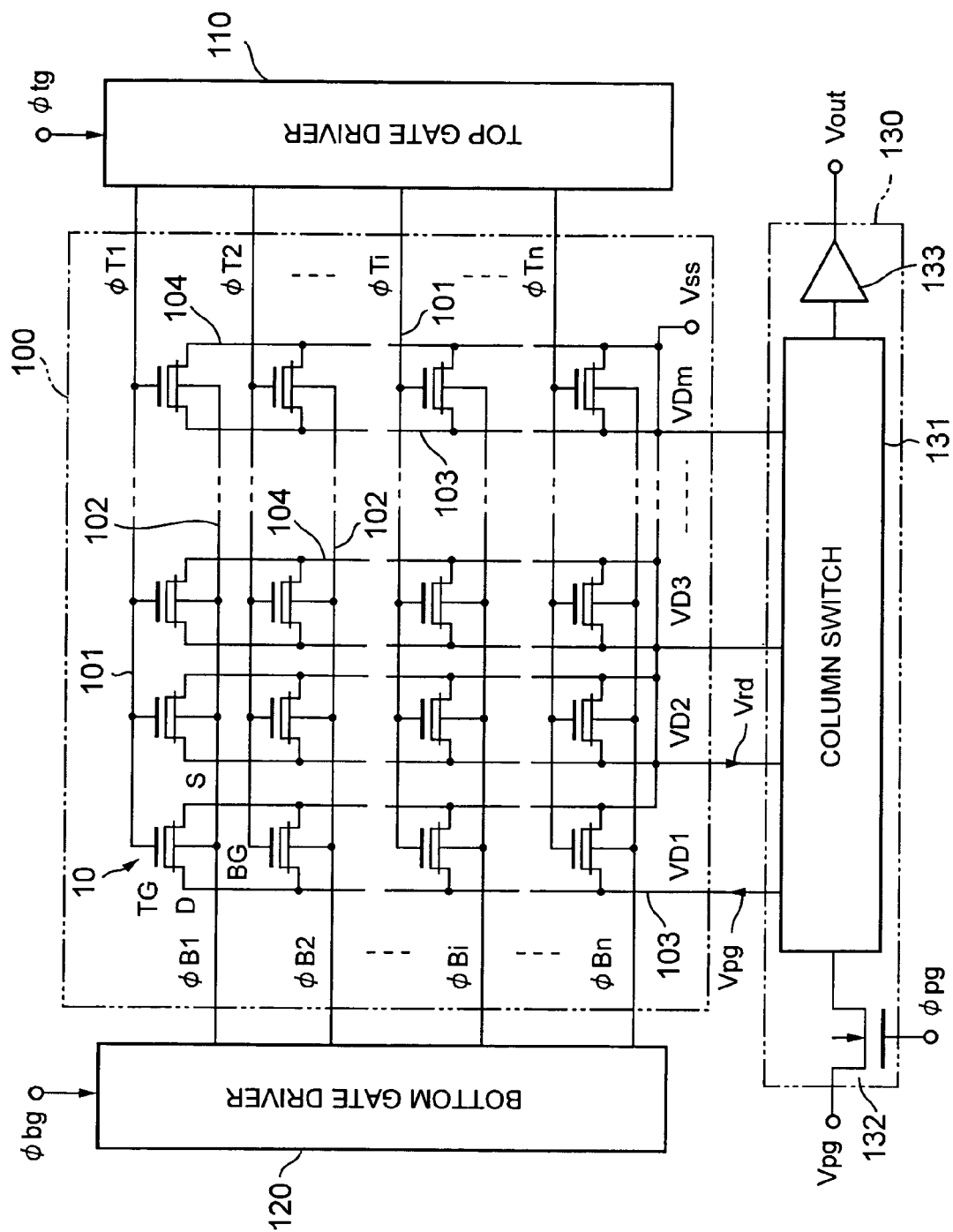
FIG. 2 shows an outline block diagram of the image reading device comprised with a photosensor array constructed with double-gate type photosensors.

FIG. 2 shows an outline block diagram of the image reading device comprised with a photosensor array constructed with double-gate type photosensors.

As shown in FIG. 2, the image reading device divided roughly is constructed with a plurality of double-gate type photosensors 10 mounted on a transparent insulating substrate. For example, a photosensor array 100 is arranged and formed in a matrix form of n lines×m columns (n, mare arbitrary natural numbers); the top gate wiring 101 extends and connects in a line direction the top gate terminals TG (top gate electrode 21) with each double-gate type photosensor 10; the bottom gate wiring extends and connects in a line direction the bottom gate terminals BG (bottom gate electrode 22) with each double-gate type photosensor 10; the drain wiring (data lines) 103 extends and connects in a column direction the drain terminal D (drain electrode) with each double-gate type photosensor 10; the source wiring (common lines) 104 connects in common the source terminal S (source electrode 13) to ground potential; a top gate driver 110 is connected to the top gate wiring 101; a bottom gate driver 120 is connected to the bottom gate wiring 102; and the drain driver 130 is connected to the drain wiring 103 comprised of a column switch 131, a precharge switch 132, the output power amplifier 133 and the like. Each of the above-stated drivers applies a predetermined signal voltage (a pulse signal and bias voltage) described later to each electrode of each double-gate type photosensor 10 and performs drive control of the double-gate type photosensors 10.

In addition, in FIG. 2, Ø tg is a control signal for generating the signals Ø T1, Ø T2, . . . Ø Ti, . . . Ø Tn selectively outputted as either-or reset voltage (reset pulse) and carrier storage voltage; Ø bg is a control signal for generating the signals Ø B1, Ø B2, . . . Ø Bi, . . . Ø Bn selectively outputted as either-or readout voltage and non-readout voltage; and Ø pg is a precharge signal which controls the timing that applies the precharge voltage Vpg.

<<Drive Control Operation of the Image Reading Device>>

Figure 3:
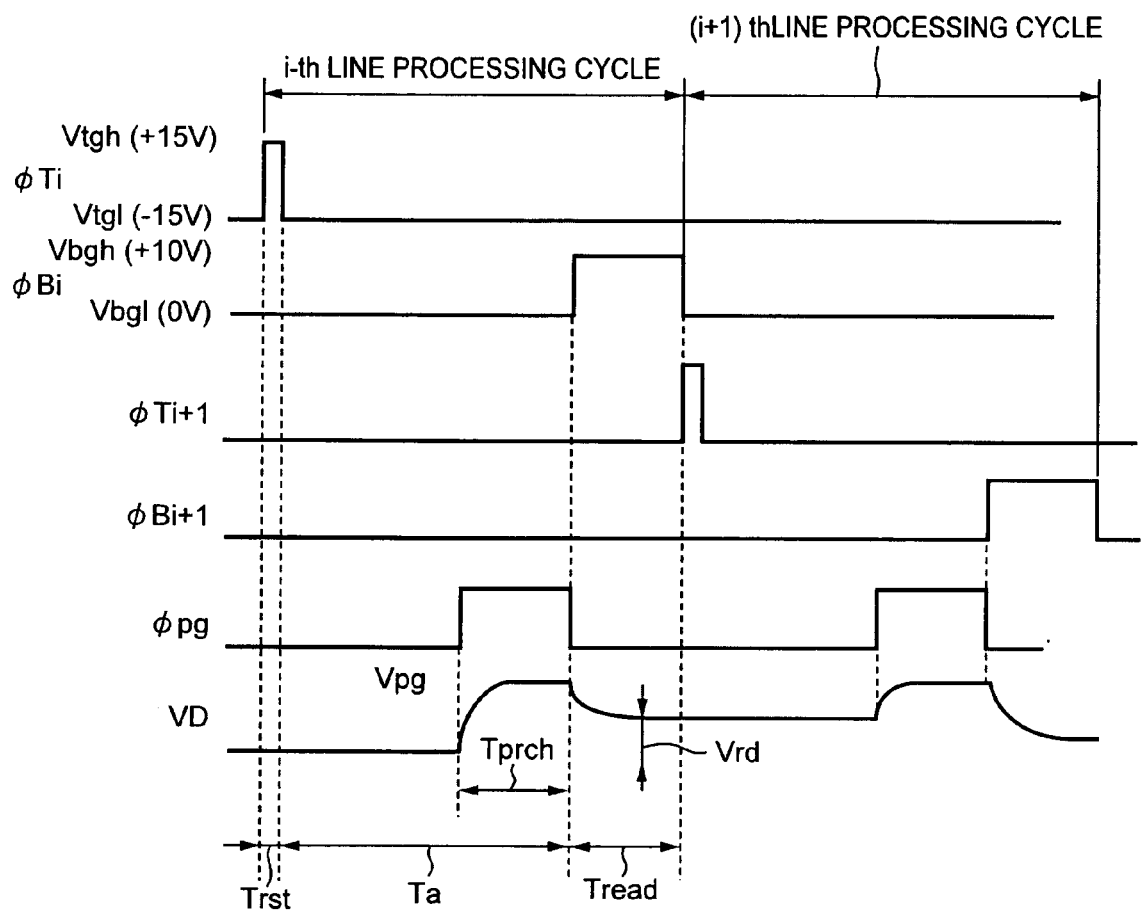
FIG. 3 shows a timing chart which illustrates the fundamental drive controlling method in the image reading device.

FIG. 3 shows a timing chart which illustrates the fundamental drive controlling method in the image reading device.

Figure 4:
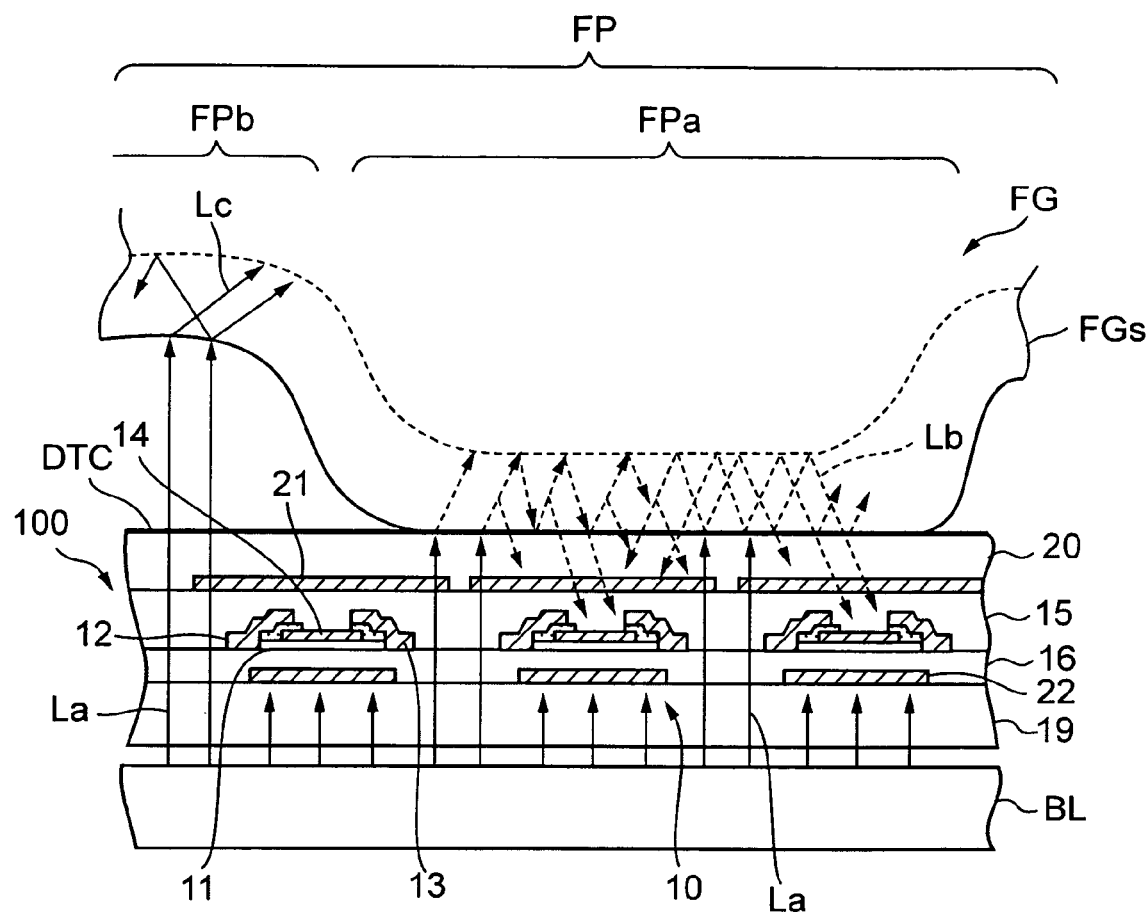
FIG. 4 shows a cross-sectional drawing of the relevant parts in the situation of applying the image reading device to a fingerprint reader.

FIG. 4 shows across-sectional drawing of the relevant parts in the situation of applying the image reading device to a fingerprint reader.

Here, the drive controlling method of the image reading device in the case where a fingerprint is read as the detectable object will be explained. FIG. 4 shows the case state provided with the backlight (illuminant) BL underneath the double-gate type photosensors 10 while a detectable object (finger) FG is placed on the detection surface DTC. In FIG. 4, a portion of the hatching showing the cross-sectional part of the image reading device is omitted for the sake of the graphic display.

Referring to FIG. 3, initially in a reset operation (initialization operation), a reset pulse (for example, a high level Vtgh +15V) Ø Ti is applied to the top gate terminal TG of the double-gate type photosensors 10 of the i-th lines (i-th are arbitrary natural numbers; i–1, 2, . . . n) via the top gate wiring 101 by the top gate driver 110; and the carrier (here a hole) stored near the interface of the semiconductor layer 11 (channel region) in the semiconductor layer 11 and the blocking insulator layer 14 radiates (reset period Trst).

Subsequently, in a charge storage operation (carrier storage operation) by applying low level (for example, Vtgl=−15V) bias voltage Ø Ti to the top gate terminal TG by the top gate driver 110, the reset operation ends and the charge storage period Ta by the carrier storage operation starts.

In the charge storage period Ta, as shown in FIG. 4, the irradiated light La is irradiated from the backlight (illuminant) BL provided in the transparent lower part of the insulating substrate 19, which is formed in the double-gate photosensors 10 shown in FIG. 1. The top gate electrode 21 involving from the transparent insulating substrate 19, each of the transparent insulator layers 16, 15, 20 and the transparent electrode layer of the photosensor array 100 are permeated. The permeated irradiated light La is irradiated by the detectable object (finger) FG placed on the detection surface DTC. Additionally, the reflected light Lb reflected by the detectable object (finger) FG passes through each of the insulator layers 20, 15, 14 and the top gate electrode 21 and carries out incidence to the semiconductor layer 11.

Here, when a finger is used as the detectable object FG, the surface of the finger has an irregular shape in proportion to the fingerprint shape as the skin outer layer FGs.

Furthermore, the irradiated light La is irradiated by the detectable object (finger) FG in the area where the detection surface DTC and the detectable object FG adhere corresponding to area of a convex part FPa of a fingerprint FP. The portion of the light Lb propagated by the inside of the skin outer layer FGs which spread having been scattered and reflected by the inside of the skin outer layer FGs permeates the transparent layers 20, 15, 14 and the top gate electrode 21 and incidence is carried out to the semiconductor layer 11 of each of the double-gate type photosensors 10.

On the other hand, in the area which does not adhere to the detection surface DTC and the detectable object FG corresponding to the area outside of a concave part FPb of the fingerprint FP and the outer edge part of the detectable object (finger) FG, the irradiated light La passes an air layer between the detection surface DTC and the detectable object. Although the detectable object (finger) FG is attained, the light is scattered within the skin outer layer FGs. Because it is difficult for the light Lc scattered within the skin outer layer FGs to escape optically in the air layer, incidence to the double-gate type photosensors 10 arranged in the position corresponding to the concave part FPb is suppressed.

Accordingly, corresponding to the amount of light which carried out incidence to the semiconductor layer 11 in the charge storage period Ta, electron hole pairs are generated within the semiconductor layer 11, and hole are stored near the interface of the semiconductor layer 11 and the blocking insulator layer 14 (periphery of the channel region).

Additionally, a precharge operation runs concurrently with the above-mentioned charge storage period Ta. Based on the precharge signal Ø pg from the drain driver 130 via the drain wiring 103, the precharge pulse (precharge voltage) Vpg is applied to the drain terminals D and the electric charge is retained in the drain electrode 12 (precharge period Tprch)

Subsequently, in a readout operation after the above-mentioned precharge period Tprch elapses, the drain voltage VD according to the carriers (holes) stored in the channel region is read (readout period Tread) to the charge storage period Ta via the column switch 131 of the drain driver 130 by applying a high level readout pulse Ø bi (for example, Vbgh=+10V) to the bottom gate terminals BG via the bottom gate wiring 102 from the bottom gate driver 120.

Here, the change inclination of the drain voltage VD closely relates to the amount of light received in the charge storage period Ta. When there are many carriers stored (light state) in the charge storage period Ta the inclination for the drain voltage VD to drop sharply is shown. On the other hand, when there are few carriers stored (dark state) the inclination to drop gradually is shown. For example, by detecting the drain voltage VD (=Vrd) after a predetermined period elapses from initiation of the readout period Tread, the luminosity data (light and dark information) according to the amount of light which carried out incidence to the double-gate type photosensors 10, that is the fingerprint shape of the detectable object (finger) FG, is detectable.

Accordingly, by applying the signal Ø Ti to the top gate terminal TG via the top gate wiring 101 from the top gate driver 110, a photo sensing function (amount of light detection function) is realized, and the signal Ø Bi is applied to the bottom gate terminal BG via the bottom gate wiring 102 from the bottom gate driver 120. A selection readout function is realized by inserting drain voltage to the drain driver 130 via the drain wiring 103 and outputting as the output voltage Vout as serial data or parallel data.

Also, in this manner the two-dimensional image (fingerprint image) of the detectable object (finger) FG can be read by repeating an equivalent procedure to each line (i, i+1, . . . ) of the above-mentioned photosensor array 100 by performing a series of image reading operations to such a specific line (the i-th line) in one cycle.

<<The First Embodiment of the Image Reading System>>

Next, the first embodiment of the image reading system related to this invention will be explained with reference to the drawings.

As to the embodiment shown below in the photosensors of the image reading device, a case where the double-gate type photosensors mentioned above are applied will be illustrated and accordingly the configuration and drive controlling method (FIG. 1 through FIG. 4) will be referenced.

Figure 5A:
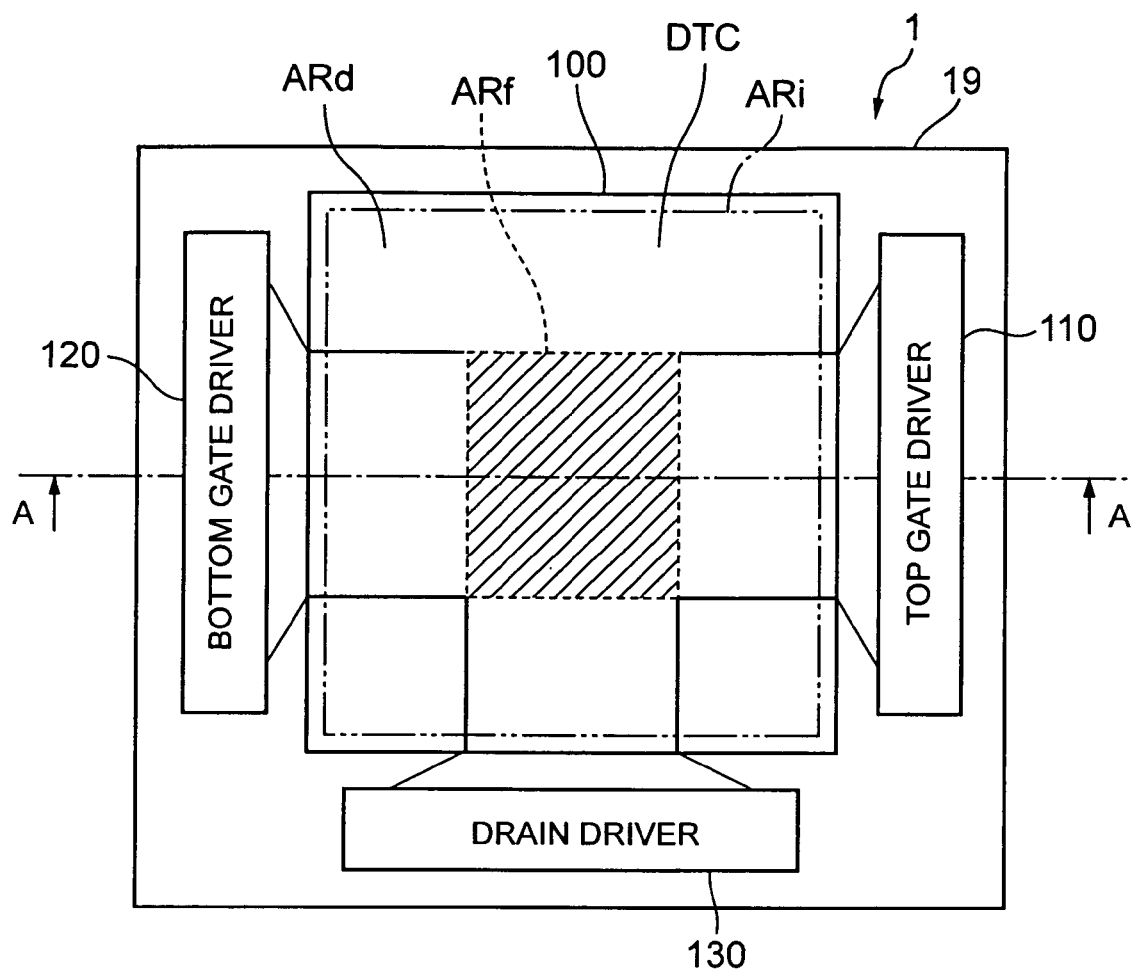
FIGS. 5A and 5B are outline block diagrams showing the first embodiment of the image reading system related to this invention.
Figure 5B:
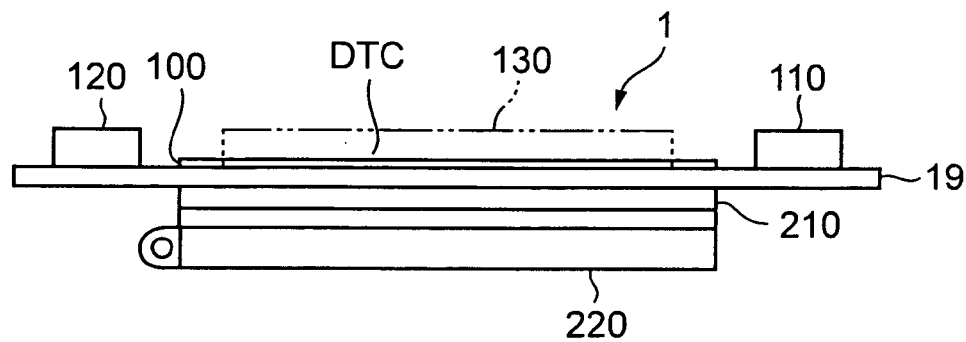

FIGS. 5A and 5B are outline block diagrams showing the first embodiment of the image reading system related to this invention.

Figure 6:
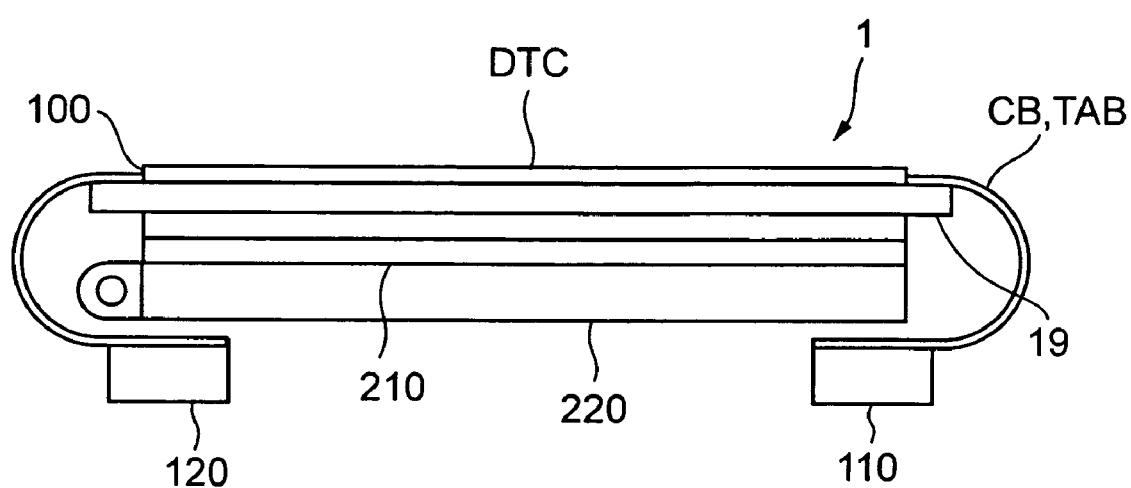
FIG. 6 is an outline sectional drawing showing a modified example of the first embodiment of the image reading system related to this invention.

FIG. 6 is an outline sectional drawing showing a modified example of the first embodiment of the image reading system related to this invention.

Here, concerning any configuration equivalent to the image reading device mentioned above, the same or equivalent nomenclature is appended and the explanation is simplified or omitted from the description.

As shown in FIGS. 5A and 5B, the image reading system related to this embodiment comprises a transmissive display panel 210 (image display device) and the photosensor array 100 (image reading device). The transmissive display panel 210 has an image display area ARi with display pixels formed in a transparent substrate in a matrix form which displays images having luminosity corresponding to the display gradation. A surface light source 220 (backlight luminescent device) is formed in the back side of the display panel 210 and radiates the light of the display panel 210 which irradiates uniformly at least the entire image display area ARi; and the photosensor array 100 is provided in the surface side (field of view side) of the display panel 210 and formed on the transparent insulating substrate 19 which has the same configuration as the image reading device shown in FIG. 2.

Also, the top gate driver 110, the bottom gate driver 120 and the drain driver 130 which drive the photosensor array 100 are mounted in the adjacent areas near the photosensor array 100 formation area on the insulating substrate 19. For example, they are formed as Integrated Circuit (IC) chips by the silicon substrate.

The display panel 210 can be applied satisfactorily to an active-matrix type liquid crystal display panel formed with Thin-Film Transistors (TFT) connected to liquid crystal pixels. For example, opposed to liquid crystal molecules filled in between the pixel electrode and the common electrode comprising the transparent substrate.

The surface light source 220, for example, the point source of the light, such as luminescent tubing or Light Emitting Diodes (hereinafter referred to as LEDs) and the like, and the backlight of the configuration by performing light guiding with an optical waveguide made to radiate and spread in the shape of the surface is applicable. A backlight configuration having a two-dimensional array of organic electroluminescent EL devices (hereinafter referred to as organic EL devices) which have a luminescent function formed in a surface shaped luminescent surface and the like can be applied satisfactorily.

This surface light source 220 from the light radiated while incidence is carried out to the image display area ARi of the display panel 210 setting the image display area ARi as the luminosity corresponding to the display gradation and performing a predetermined image display, at least a portion of the light radiated from the surface light source 220 permeates the display pixels of the display panel 210 and radiated from the display pane 12 as the display illumination. This display illumination carries out incidence to the photosensor array 100 and performed as the irradiated light La in FIG. 4 for reading the detectable object image.

The photosensor array 100 at least has a covered detection surface DTC in the entire image display area ARi in the above-mentioned display panel 210. This detection surface DTC, as shown in FIG. 5A, has at least the image pick-up area (the first sub-area; for convenience hatching is applied and shown in the drawing) ARf which reads the image of the detectable object where the detectable object is placed; and a dummy area (the second sub-area) which does not read the detectable object image except for the image pick-up area ARf. Here, as shown in FIG. 5A, for example the image pick-up area ARf is located approximately in the center of the image display area ARi or the photosensor array 100 and established as an area which has a rectangular shape of arbitrary dimensions (for example, 12 mm/0.472 in length× 10 mm/0.393 in width rectangle). In addition, it cannot be overemphasized that the position, dimensions and the like of the image pick-up area ARf may be what are suitably changed according to the form and specification of the electronic devices in which the image reading system related to this invention is mounted. Moreover, the details of the configuration of the image pick-up area ARf and a dummy area ARd will be described later.

Besides, in the above-mentioned FIG. 5B, although each driver formed as an IC chip is mounted on the insulating substrate 19, you may locate not only this driver but each driver to a space that has ample room upon installing an image reading system 1 comprising the photosensor array 100. Specifically, for example as shown in FIG. 6, the photosensor array 100 which is formed in the entire surface side of the insulating substrate 19 in the image reading system 1, the flexible cable CB and TAB tape which are connected to each of the top gate wiring 101, the bottom gate wiring 102 and the drain wiring 103 are made to extend. For example, you may relocate the top gate driver 110, the bottom gate driver 120 and the drain driver to a suitable space by the back side of the surface light source 220. Accordingly, it is easy to relocate each of the drivers 110, 120 and 130 to a suitable roomy space upon mounting to be able to make the upper surface of the photosensor array 100 into a nearly flat shape for touching the detectable object (finger) FG to the detection surface's upper surface of the photosensor array 100.

Likewise, in FIG. 5B or FIG. 6, for example although each of the above-stated drivers 110, 120, 130 can be formed as an IC chip to the silicon substrate, it is not limited to this. For instance, on the insulating substrate 19, it may be unified to form a single unit and built up in the photosensor array 100. In that case, the thickness of each driver portion can be made to a very thin thickness in the photosensor array 100 and the thickness of the image reading system 1 comprised with this can made into a thinner profile.

Subsequently, the configuration of the image pick-up area ARf in the photosensor array 100 and the dummy area ARd in the image reading device of this embodiment will be explained in detail.

Here, the configuration formed by only the wiring that connects the double-gate type photosensors and each of the drivers 110, 120, 130 which constitute the image pick-up area ARf to the adjacent areas other than the image pick-up area Arf for comparison is shown and the configuration of the image reading system 1 related to this embodiment and the effectiveness are explained.

Figure 7A:
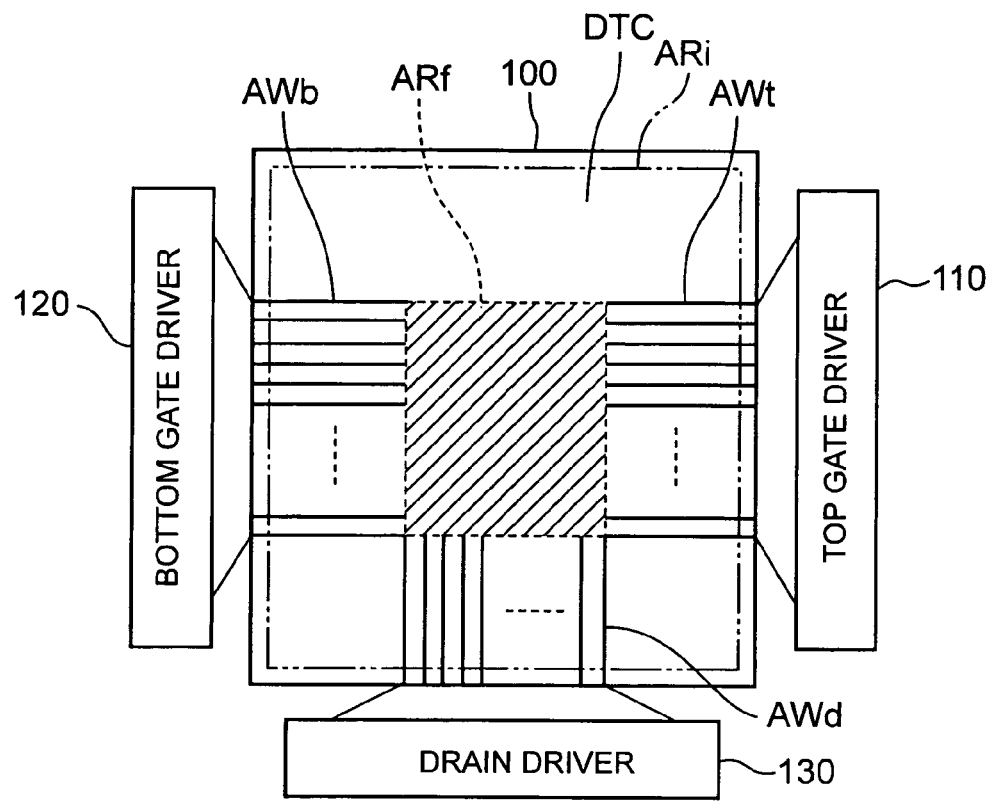
FIG. 7A shows an outline block diagram illustrating the configuration as a comparative object in which only the wiring area is formed in the adjacent areas other than the image pick-up area of the detection surface of the photosensor array.

FIG. 7A shows an outline block diagram illustrating the configuration as a comparative object in which only the wiring area is formed in the adjacent areas other than the image pick-up area of the detection surface of the photosensor array.

Figure 7B:
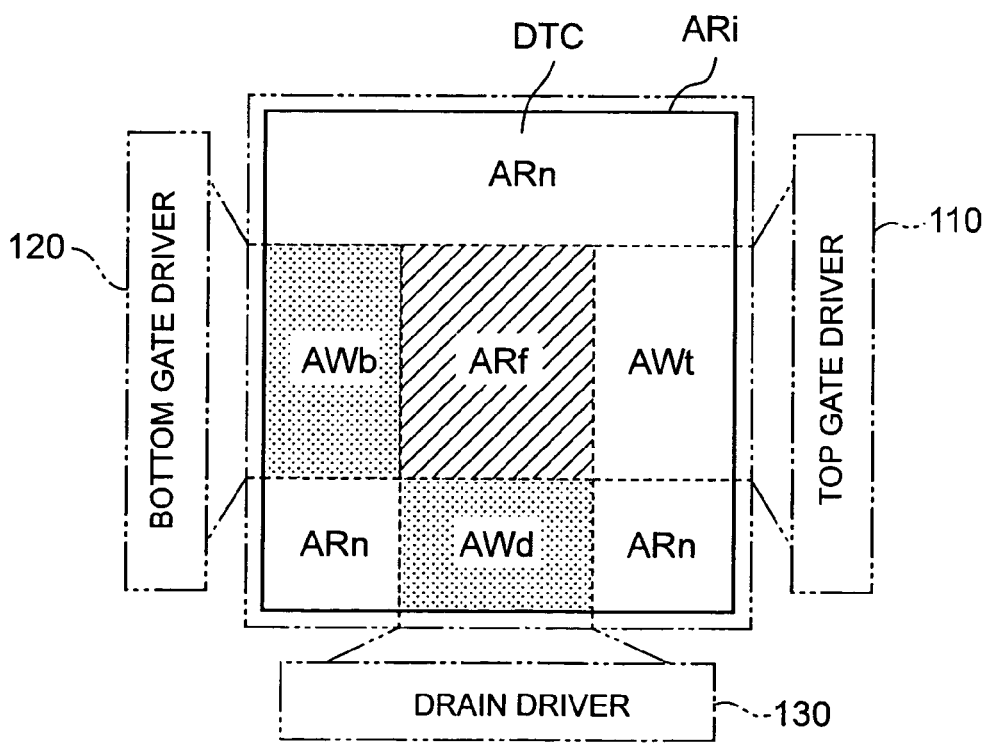
FIG. 7B is the schematic diagram in the configuration of FIG. 7A showing the luminance distribution of the image display area.

FIG. 7B is the schematic diagram in the configuration of FIG. 7A showing the luminance distribution of the image display area.

Figure 8:
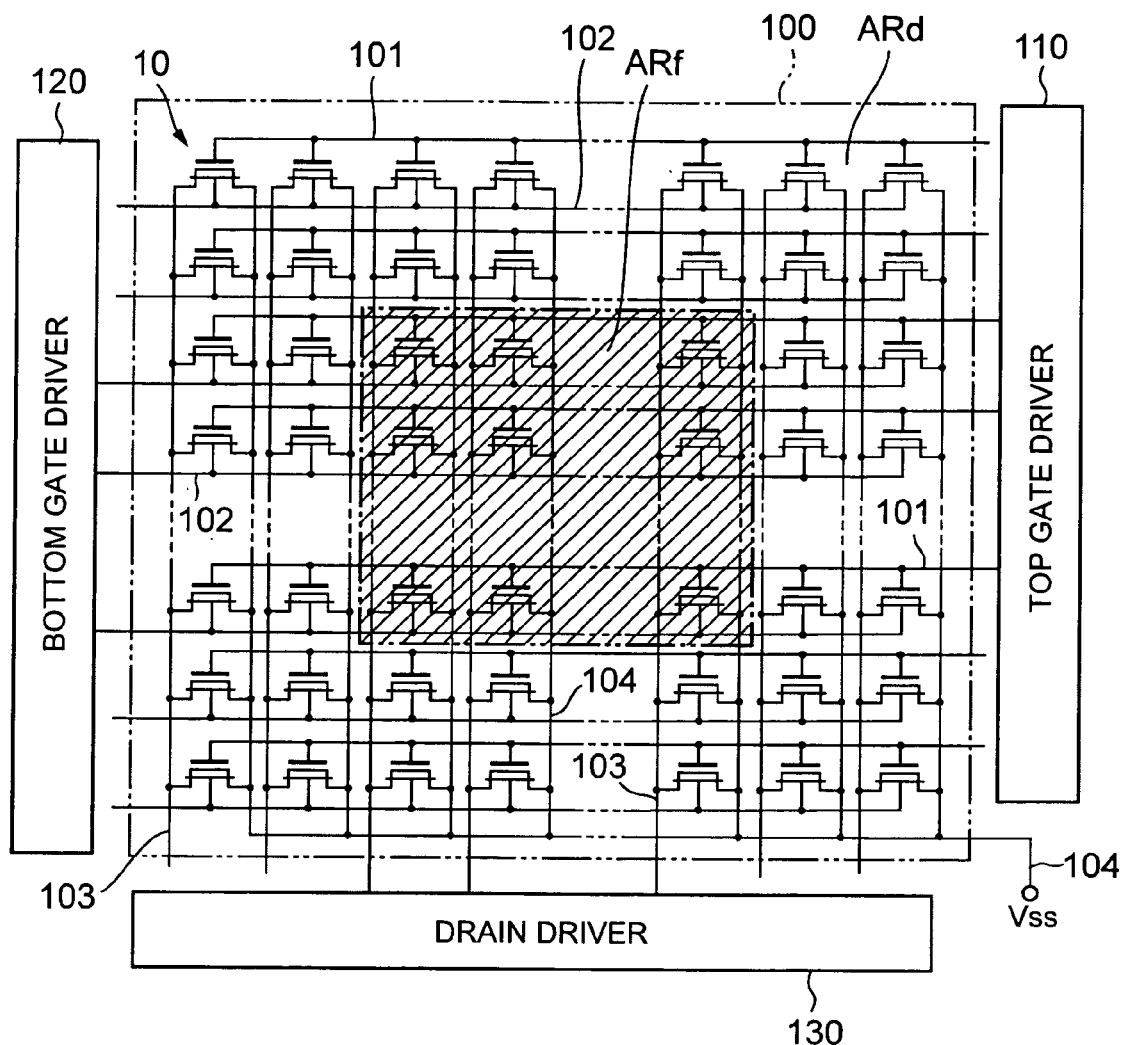
FIG. 8 is an outline block diagram showing the configuration of the detection surface in the photosensor array of the image reading device in the first embodiment of the image reading system related to this invention.

FIG. 8 is an outline block diagram showing the configuration of the detection surface in the photosensor array of the image reading device in the first embodiment of the image reading system related to this invention.

Shown in FIG. 7A are the adjacent areas of the image pick-up area ARf in the detection surface DTC of the photosensor array 100 equivalent to the dummy area ARd which is the field of view side of the display panel 210. Shown in FIG. 1A is when only the wiring areas AWt, AWb and AWd are formed which connects the wiring of each of the double-gate type photosensors 10, the top gate driver 110, the bottom gate driver 120 and the drain driver 130 which constitute the image pick-up area ARf. The top gate electrode 21 of the double-gate type photosensors 10 is constituted by a transparent electrode layer and the bottom gate electrode 22, the drain electrode 12 and the source electrode 13 are constituted by an electrode layer with an opaque metal layer and the like. When these electrodes are each formed in one system with the top gate wiring 101, the bottom gate wiring 102, the drain wiring 103 and the source wiring 104, since the wiring area AWt between the top gate driver 110 from the above-stated image pick-up area ARf is formed only by the transparent top gate wiring 101, the permeability (transmittance) of this wiring area AWt becomes higher. Correspondingly, since each of the wiring areas AWb and AWd between the bottom gate driver 120 from the image pick-up area ARf and the drain driver 130 from the image pick-up area ARf are formed with the opaque bottom gate wiring 102, the drain wiring 103 and the source wiring 104, the permeability (transmittance) of these wiring areas AWb and AWd becomes lower than the wiring area AWt. Further, in the image pick-up area ARf, since all of the double-gate type photosensors 10, the top gate wiring 101, the bottom gate wiring 102, the drain wiring 103 and the source wiring 104 which have the top gate electrode 21, the bottom gate electrode 22, the drain electrode 12 and the source electrode 13 are formed, the permeability (transmittance) of the image pick-up area ARf becomes lower than the wiring areas AWb and AWd (the transmittance of this image pick-up area ARf is 80% or less generally). Also, in FIG. 7A to clarify the image pick-up area ARf, hatching is applied for convenience.

Therefore, the photosensor array 100 which has such a wiring structure with a laminated layer arrangement prepared in the field of view side of the display panel 210 and located on the back side of the display panel 210. The luminosity of the area corresponds to the image display area ARi via the photosensor array 100 when irradiating uniform light in the surface via the display panel 210 from the surface light source 220 which irradiates uniformly the entire image display area ARi. As shown in FIG. 7B, the luminosity of the image pick-up area ARf in which the double-gate type photosensors 10 and each wiring are formed becomes the lowest; the luminosity of the wiring areas AWb and AWd in which the bottom gate wiring 102 or the drain wiring 103 and source wiring 104 are formed becomes higher than the luminosity of the image pick-up area ARf; the luminosity of the wiring area AWt in which only the top gate wiring 101 are formed becomes higher than the luminosity of the wiring areas AWb and AWd; and the luminosity of the area Arn in which neither of the wiring are formed becomes the highest.

Also, in FIG. 7B the hatching shows the luminescent luminosity in each area for convenience.

Accordingly, in the photosensor array 100 configuration prepared with a laminated layer arrangement in the field of view side of the display panel 210 that has a structure in which only the wiring of the double-gate type photosensors 10 are formed in areas other than the image pick-up area ARf, because variation occurs in the permeability (transmittance) in each wiring area, when the image information is displayed on the display pane 210 via the photosensor array 100 luminosity unevenness will occur in the image display area ARi and the display quality will drop greatly.

Therefore, in this embodiment, the detection surface DTC of the photosensor array 100 in the area corresponding to the image display area ARi can set with the display panel 210 at least the photosensors in the image pick-up area ARf to the dummy area ARd other than the image pick-up area ARf as the dummy photosensors and dummy wiring have the same size and structure and each wiring is formed with the same array pitch as the array pitch in the image pick-up area ARf. Thereby, permeability (transmittance) in both the image pick-up area ARf of the photosensor array 100 and the dummy area ARd can be accomplished equally and permeability (transmittance) of the entire detection surface can be performed uniformly. Accordingly, when the image in formation displayed on the display panel 210 is displayed via the photosensor array 100, the unevenness of the luminosity in the image display area ARi can be reduced and deterioration of the display quality can be suppressed.

Specifically, as shown in FIG. 8, the double-gate type photosensors 10 in the detection surface DTC of the photosensor array 100 which encompasses the entire area corresponding to the image display area ARi of the display panel 210 at least and have the same size and structure are arranged in a matrix form at fixed array intervals (pitch). Additionally, the double-gate type photosensors 10 formed in the image pick-up area ARf are each connected to the top gate driver 110, the bottom gate driver 120 and the drain driver 130 via the top gate wiring 101, the bottom gate wiring 102 and the drain wiring 103, predetermined signal voltage is applied from each driver and has a configuration which drives only the double-gate type photosensors 10 formed in the image pick-up area ARf. Also, in FIG. 8, to define the image pick-up area ARf, hatching is added for convenience.

Here, the arrangement interval between each of the double-gate type photosensors 10 formed in the area corresponding to the image display area ARi of the display panel 210 at least of the photosensor array 100 is set at an arrangement interval by which the double-gate type photosensors 10 are placed in between the display pixels formed in the display panel 210 and can be made in an arrangement so that the display pixels may not superficially overlap with the double-gate type photosensors 10.

Furthermore, the array interval of the double-gate type photosensors 10 is made smaller (generally 50 µm (micrometers) or less) than the pitch between the display pixels of the display panel 210 and can be made so that the double-gate type photosensors 10 in the image display area ARi and overlap of the display pixels become equal in the surface. In this case, the image information displayed with the display panel 210 is shielded in part by the double-gate type photosensors 10 and can suppress display quality deterioration.

Here, the double-gate type photosensors 10 formed in the dummy area ARd, for equalizing the transmittance in the detection surface DTC of the photosensor array 100 and suppressing the unevenness of the luminosity in the image display area ARi at the time of the image in formation display, though they connect with the top gate wiring 101, the bottom gate wiring 102 and the drain wiring 103, they do not connect with the top gate driver 110, the bottom gate driver 120 and the drain driver 130. Accordingly, predetermined signal voltage from each driver can be easily applied and drive only the double-gate type photosensors 10 formed in the image pick-up area ARf.

Thus, in the image reading system 1 related to this embodiment, the photosensor array 100 by which the photosensors (double-gate type photosensors 10) are arranged is formed corresponding to the entire image display area of the image display device and only the photosensors of the image pick-up area ARf which read the detectable object image are connected to each driver via fixed wiring. On the other hand, the photosensors of the other dummy area ARd are connected only to fixed wiring by having a configuration not connected to each driver. Thus, the transmittance of both sides of the image pick-up area ARf and the dummy area ARd of the photosensor array 100 can be accomplished equally, and the transmittance in the entire detection surface DTC can be uniformized.

Therefore, while the detectable object (for example, finger) is placed in the image pick-up area ARf set as the specific area of the photosensor array 100 which has a laminated layer arrangement made on the display panel 210, an image reading operation which reads the image pattern (fingerprint) can be achieved satisfactorily, the luminosity in the image display area ARi can be performed uniformly and an image display operation which displays the image information shown on the display panel 210 on the field of view side via the photosensor array 100 can be achieved satisfactorily.

Also, since the configuration uses the double-gate type photosensor 10 having a Thin-Film Transistor (TFT) structure which applied semiconductor manufacturing technology as the photosensors in the photosensor array 100 is applicable, the image reading structure of the system equipped with an image reading device can be thin-shaped; thereby, the thickness of electronic devices comprising the image reading system can also have a thinner profile.

In the image reading device using the double-gate type photosensors 10, because the image reading operation acquires light and dark information based on the amount of light which carried out incidence by means of scattering (dispersion) and reflection of the light which irradiated the detectable object, the conductive layer for use in electrostatic discharges and the like can be formed in the upper surface of the detection surface DTC of the photosensor array 100. Accordingly, the countermeasure against static electricity which suppresses breakdown and malfunction caused by static electricity can be simply achieved.

Also, the reading operation of the detectable object image by the photosensor array 100 in the image reading system 1 related to this embodiment, as shown in FIG. 4, the light is radiated from the surface light source 220 and permeated to the display pixels of the display panel 210, incidence is carried out to the photosensor array 100 as irradiated light La, the light permeated to the photosensor array 100 is irradiated by the detectable object and carried out by subjecting the light reflected by the detectable object with the photosensors. Under the present circumstances, in order to read a detectable object image satisfactorily, it is preferable to set the luminosity intensity irradiated by the detectable object as the optimal intensity according to the surrounding environment illumination. Then, when performing the reading operation of the detectable object image by the photosensor array 100, it can be set to the luminosity intensity irradiated by the detectable object via the display panel 210, that is, the image display area ARi of the display panel 210. Thereby, you can set the luminosity of the area corresponding to at least the image pick-up area ARf as the luminosity suitable for reading of the detectable object image.

Accordingly, the image reading system related to this embodiment, while having the function in which the image reading device has a configuration prepared with a laminated layer arrangement in the field of view of the image display device and reads the image of the detectable object, the image display function by the image display device is not detracted, but comprises a configuration which can perform the image display of satisfactory display quality. Herewith, because there is no need for providing electronic devices comprised with the aforementioned image reading system in a situation whereby the electronic apparatus image reading device has a separate display and the like, while comprised with the image reading feature of an image reading device, it has the effect that the size of the electronic devices can be prevented from increasing and installed into small, portable electronic devices that are thin shaped and lightweight devices strongly in demand, such as cellular/mobile phones, Personal Digital Assistants (PDA) and the like. Additionally, because the image pick-up area on which a detectable object is placed can be set up in arbitrary sizes in the detection surface of the photosensor array, in the personal authentication system comprised with the aforementioned photosensor array and hereinafter described, the system can be set to a comparatively large area easily; can read detectable object images satisfactorily, such as a fingerprint; and has an advantage that a stabilized personal authentication operation can be performed.

Besides, since the image reading system related to this embodiment has a configuration made with a laminated layer arrangement in the image reading device separately prepared in the field of view side of the image display device, the manufacturing technology and design properties in an existing image display device and existing image reading device can be converted as it is, the product yield rate can be improved and product cost reduction can be promoted.

<<The Second Embodiment of the Image Reading System>>

Next, the second embodiment of the image reading system related to this invention will be explained with reference to the drawings.

Figure 9:
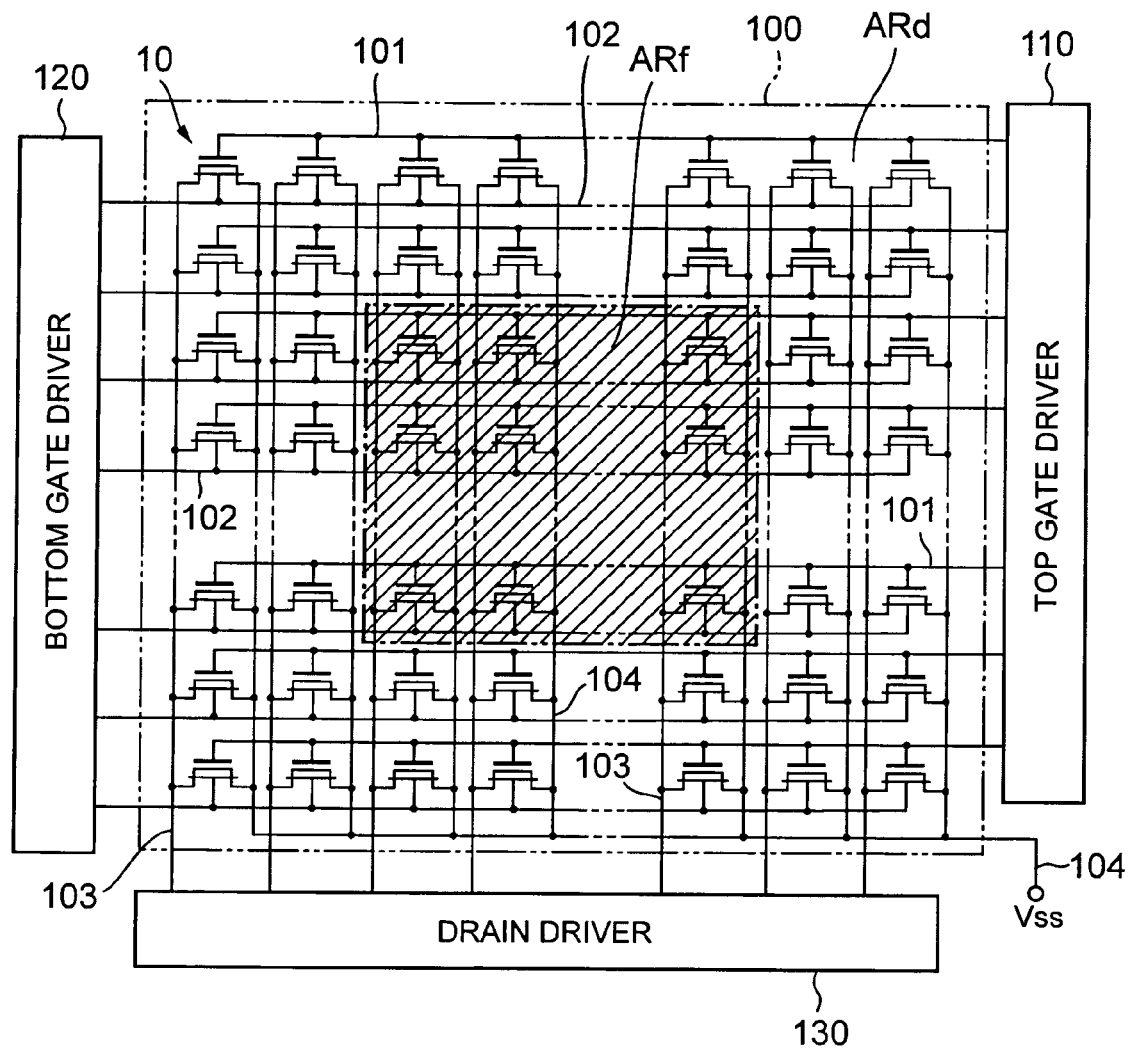
FIG. 9 is an outline block diagram showing the configuration of the detection surface in the photosensor array of the image reading device in the second embodiment of the image reading system concerning this invention.

FIG. 9 is an outline block diagram showing the configuration of the detection surface DTC in the photosensor array of the image reading device in the second embodiment of the image reading system concerning this invention.

As shown in FIG. 9, the image reading system which is related to this embodiment has a configuration that while encompassing the entire area corresponding to the image display area ARi of the display panel 210 at least in the detection surface DTC of the photosensor array 100 with the double-gate type photosensors 10 arranged in a matrix form identical to the first embodiment, all of the double-gate type photosensors 10 formed in the image pick-up area ARf and the dummy area ARd are each electrically connected with the top gate driver 110, the bottom gate driver 120 and the drain driver 130 via the top gate wiring 101, the bottom gate wiring 102 and the drain wiring 103.

In the image reading system related to this embodiment, although all the double-gate type photosensors 10 that constitute the photosensor array 100 made with a laminated layer arrangement in the field of view of the display panel 210 are comprised with the configuration connected to each driver, when performing the image reading operation based on the drive control operation of the image reading device, the drive control of the operation which reads the light and dark information on the detectable object is implemented out so that it executes only the image pick-up area on which the detectable object is placed.

More specifically, in the above-mentioned first embodiment, as shown in FIG. 8, by forming the double-gate type photosensors 10 and the top gate wiring 101, the bottom gate wiring 102 and the drain wiring 103 throughout the area corresponding to at least the image display area ARi in the detection surface DTC of the photosensor array 100, transmittance in the image pick-up area ARf is performed equally, constituted so that the transmittance in the entire detection surface DTC may be uniform and at this point is the same configuration as in the second embodiment.

However, although in the first embodiment as a configuration the double-gate type photosensors 10 formed in the dummy area ARd are made to carry out drive control only of the double-gate type photosensors 10 which are not connected to each driver and are formed in the image pick-up area ARf, these double-gate type photosensors 10 which are not connected to the drivers or each wiring 101, 102 and 103 exist in an electrical floating state. For example, when the driver voltage is applied to the double-gate type photosensors 10 and each wiring 101, 102 and 103 which are arranged in the image pick-up area ARf at the image reading operation time, because of the existing electrical floating state or when the detectable object charged with static electricity is placed on the image pick-up area ARf, voltage which is not expected may be induced.

Such voltage effects the reading operation in the double-gate type photosensors 10 in the image pick-up area ARf and becomes the source which causes malfunctions and failures of a driver should excessive current and the like flow into a driver.

Consequently, in this embodiment each of the double-gate type photosensors 10 or each wiring 101, 102 and 103 arranged in the dummy area ARd are kept from being in a floating state by also connecting each driver to the double-gate type photosensors 10 arranged in the dummy area ARd and applying predetermined voltage. Thus, induction of the above unexpected voltage can be prevented and a stable image reading operation without malfunctions is achievable.

As mentioned above, in the image reading system related to the first and second embodiments, the image reading device is comprised of a laminated layer arrangement in the field of view of the image display device with the photosensor array constituted by permeable material. The image pick-up area which reads the detectable object image is set as a portion of the area of the photosensor array and the dummy area which has a device configuration equivalent to the image pick-up area is set as areas other than the image pick-up area of the photosensor array.

Accordingly, while the image reading operation which reads the detectable object image can be achieved satisfactorily in the image pick-up area of the photosensor array, the image display operation is not concerned with the image pick-up area and the dummy area but displays the image information shown on the display panel with uniform luminosity via the photosensor array which can be achieved satisfactorily.

Therefore, when such an image reading system is mounted in electronic devices, such as a cellular/mobile phone and a notebook personal computer (PC) and the like, for example, the display is guided so that a user's finger can be placed on the display panel when using this electronic device. A finger is placed on the photosensor array upon the display panel and a fingerprint image is read. An activation control can then be carried out or personal authentication in Internet shopping and the like can be accomplished so that the individual person can be authenticated, identified and the activity of the aforementioned electronic device can be permitted or rejected. Such a personal authentication system will be described later.

<<The Third Embodiment of the Image Reading System>>

Next, the third embodiment of the image reading system related to this invention will be explained with reference to the drawings.

Figure 10A:
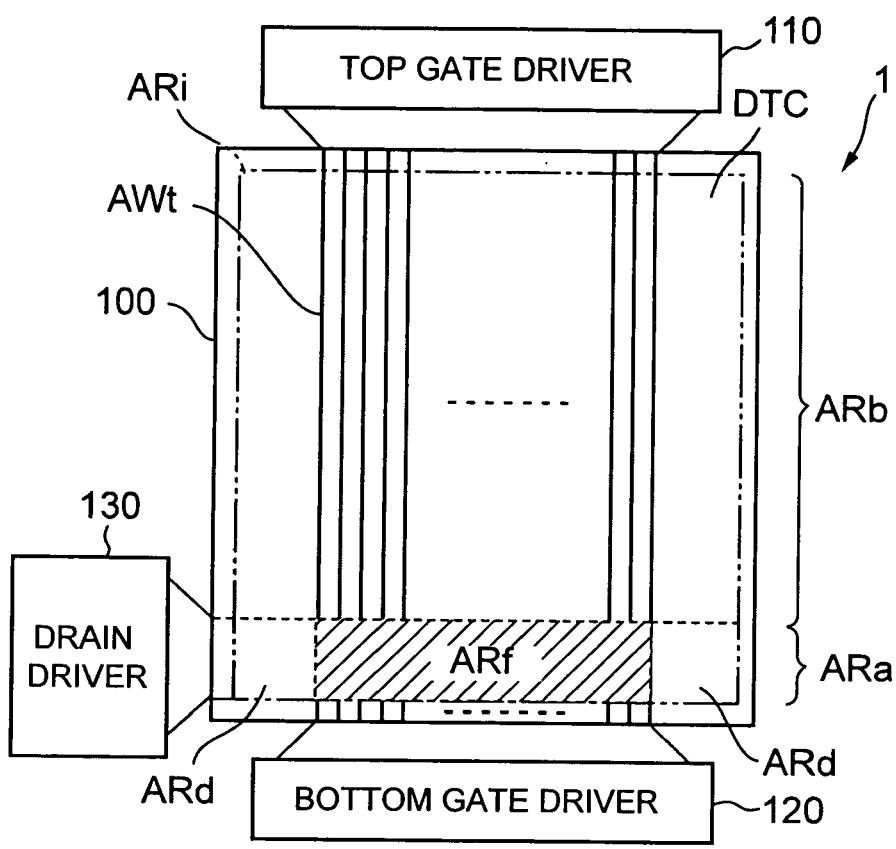
FIGS. 10A and 10B are outline block diagrams showing the third embodiment of the image reading system related to this invention.
Figure 10B:
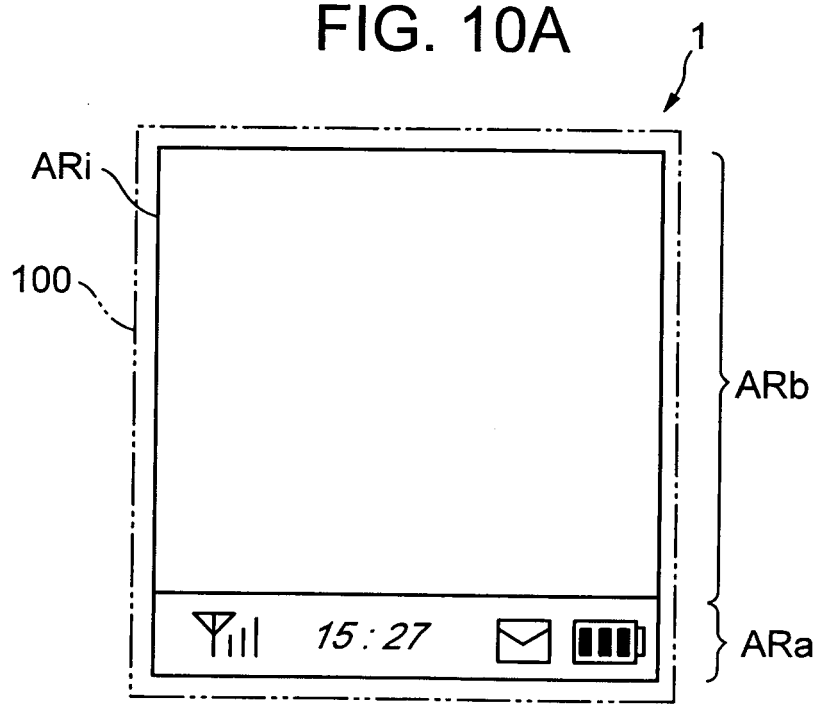

FIGS. 10A and 10B are outline block diagrams showing the third embodiment of the image reading system related to this invention.

Figure 11:
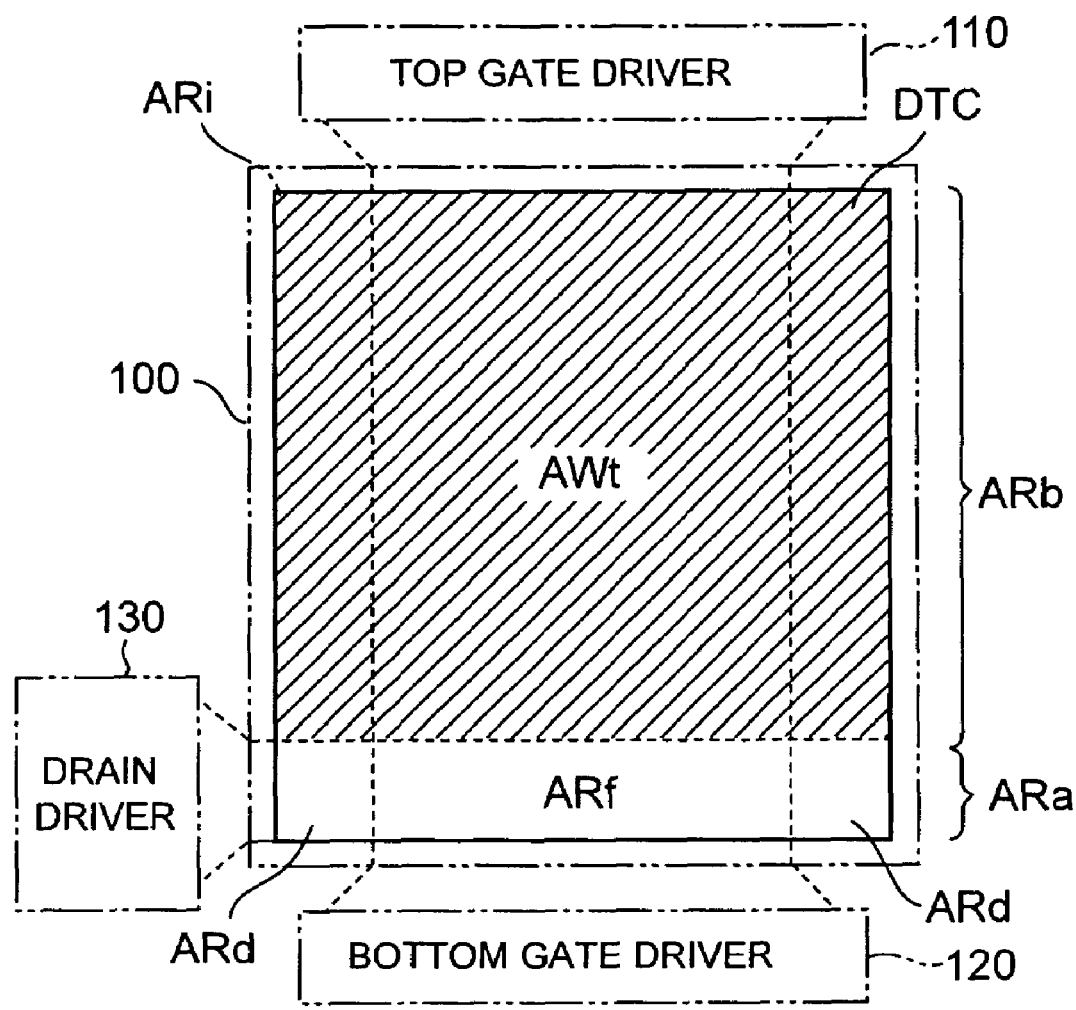
FIG. 11 is a schematic diagram in the third embodiment of the image reading system related to this invention illustrating an example of the luminance distribution of the image display area.

FIG. 11 is a schematic diagram in the third embodiment of the image reading system related to this invention illustrating an example of the luminance distribution of the image display area.

Here, concerning any configuration equivalent to the first embodiment above, the same or equivalent nomenclature is appended and the explanation is simplified or omitted from the description.

The image reading system 1 related to this embodiment is similar to each of the above-mentioned embodiments in a configuration by which a laminated layer arrangement of the photosensor array 100 corresponding to the image display area ARi of the display panel 210 is carried out at least in the field of view side of the display panel 210. It has a configuration which sets the image pick-up area ARf and the dummy area ARd as areas corresponding to an area in which images that are not the main data of the image information displayed on the image display area ARi in the display panel 210 in the photosensor array 100 and of relatively low importance are displayed.

Specifically, as shown in FIGS. 10A and 10B, in an electronic device in which the aforementioned image reading system is mounted, the area which displays the operating state of the device, such as battery residual quantity (battery level), the communication environment (radio field intensity—synonym field strength), time of day, mode of operation and the like, within the image display area ARi is performed in a sub-display area ARa. The area corresponding to the sub-display area ARa of the photosensor array 100, for example, the image pick-up area ARf (first sub-area; hatching is shown in the drawing for convenience) is set up approximately in the center. Except for the image pick-up area ARf in the area corresponding to the aforementioned sub-display area ARa, the dummy area ARd (second sub-area) is set as a sub-area. The photosensor for use in image reading is formed in the image pick-up area ARf and dummy photosensor is formed in the dummy area ARd.

Additionally, a main display area ARb is the area which displays the desired image information according to a user's manipulation, except for the sub-display area ARa of the image display area ARi, such as a schedule, an address book, a text editing screen, a still picture, animation and the like. This sub-area corresponding to the main display area ARb (third sub-area) of the photosensor array 100 at least in part is formed with the top gate wiring area AWt.

In addition, the top gate wiring area AWt of the photosensor array 100, as shown in FIG. 10A, may be formed in a portion of the area corresponding only to the image pick-up area ARf which actually reads the detectable object image, and also it may be formed throughout the area corresponding to the main display area ARb equivalent to the double-gate type photosensors 10 arranged to the sub-areas (the image pick-up area ARf and the dummy area ARd) corresponding to the sub-display area ARa. In the case of the latter, the top gate wiring 101 connected to the double-gate type photosensors 10 arranged in the dummy area ARd, it may be a configuration which is not electrically connected to the top gate driver 110 as in the case of the first embodiment mentioned above. Alternatively, it may connect with the top gate driver 110 like in the case of the second embodiment and the driver voltage is applied like the double-gate type photosensors 10 arranged in the image pick-up area ARf and made to carry out drive control.

Here, as shown in FIG. 10A, the top gate driver 110 is arranged on the top side. Since the top gate wiring 101 is constituted by transparent electrodes in a configuration which provides the top gate wiring area AWt in the sub-area corresponding to the main display area ARb, the transmittance of the sub-area (third sub-area) corresponding to the main display area ARb including the wiring area AWt of the photosensor array 100 becomes relatively high.

Meanwhile, the bottom gate driver 120 and the drain driver 130 are each arranged on the bottom side and on the side of the photosensor array 100 in a configuration which provides the image pick-up area ARf and the dummy area ARd in the area corresponding to the sub-display area ARa. Since the double-gate type photosensors 10 and each wiring 101, 102 and 103 are arranged in the area corresponding to the sub-display area ARa, the transmittance corresponding to this sub-display area ARa in which the sub-areas (first sub-area and second sub-area) can set becomes relatively low.

In the above-mentioned configuration, as the image display device illustrated in the above-stated embodiment, the configuration consists of the surface light source 220 which irradiates uniformly the entire image display area ARi of the transmissive display panel 210 and the display panel 210 is applied. The area corresponding to the main display area ARb which displays desired image information is shown in FIG. 11 when the image display is made to be carried out via the photosensor array 100. Since the transmittance of the photosensor array is relatively high, a bright sharp image display can be effected and the information for which the user wishes can be displayed in relatively high display quality. However, in the area corresponding to the sub-display area ARa that displays images which are not the main data and of low importance information, since the transmittance of the photosensor array 100 is relatively low, the image display becomes relatively dark with low image quality.

Consequently, in this embodiment the luminosity of the area corresponding to the sub-display area ARa of the display panel 210, while set to a relatively high luminosity which is a degree from when a satisfactory display quality is acquired in the sub-display area ARa through the photosensor array 100, the present invention comprises a luminosity setting means which sets the luminosity of the area corresponding to the main display area ARb of the display panel 210 so that it becomes low relative to the luminosity of the area corresponding to the sub-display area ARa. Thereby, the luminosity of the entire image display area ARi via the photosensor array 100 becomes approximately uniform luminosity and enables it to acquire satisfactory display quality throughout the image display area ARi.

In detail, first the luminosity setting means asks for the transmittance in the top gate wiring area AWt, the image pick-up area ARf and the dummy area ARd of the photosensor array 100 which are provided in the field of view side of the display panel 210. This transmittance is previously calculable based on the cross section structure, quality of material, film thickness and the like to be used. Other wise the transmittance of each area can be measured by making it ask about the status of the photosensor array 100.

Furthermore, when comprising the surface light source 220 which irradiates the image display area ARi of the transmissive display panel 210 and the display panel 210, the luminosity of the luminescent surface of the surface light source 220 is set to a relatively high luminosity which is a degree from when a satisfactory display quality is acquired in the sub-display area ARa through the photosensor array 100, the luminosity setting means is based on the difference of the transmittance in the top gate wiring area AWt, the image pick-up area ARf and the dummy area ARd. For example, the filter for reducing luminosity and the like is provided in the luminescent surface of the surface light source 220 of the area corresponding to the main display area ARb. It is set so that the luminosity of the area corresponding to the main display area ARb of the display panel 210 becomes low luminosity in the area corresponding to the sub-display area ARa and set so the luminosity of the image display area ARi via the photosensor array 100 becomes approximately uniform overall.

Also, in the above, although considered as part of the configuration which makes the luminosity of the area corresponding to the main display area ARb of the display panel 210 of the surface light source 220 lower than the luminosity of the area corresponding to the sub-display area ARa, as mentioned above and shown in FIG. 10A, when the top gate wiring area AWt of the photosensor array 100 is formed in a portion of the areas of the sub-area corresponding to the main display area ARb, the transmittance of the top gate wiring area AWt in the sub-area corresponding to the main display area ARb of the photosensor array 100 and the other sub-areas in which wiring is not formed at all differs and the transmittance toward the latter becomes higher. Consequently, the luminosity in areas other than the top gate wiring area AWt of the sub-area corresponding to the main display area ARb of the surface light source 220 is further provided with a suitable filter and the like. For example, it can be set lower than the luminosity of the area corresponding to the top gate wiring area AWt.

In the above, although the configuration with provides a filter and the like in the luminescent surface of the surface light source 220 and adjusts luminescent luminosity by a luminosity setting means is applied, as the surface light source 220 a configuration which performs two-dimensional array of light emitting devices, such as organic EL devices and LEDs, is applicable.

In this case, as the luminosity setting means, based on the difference of the transmittance in the above-stated top gate wiring area AWt, the image pick-up area ARf and the dummy area ARd, the luminescent luminosity of the LEDs arranged in the equivalent location can be controlled. It may be applied to the configuration controlled so that the luminescent luminosity of the LEDs of the area corresponding to the sub-display area ARa of the display panel 210 becomes higher relative to the luminescent luminosity of the LEDs of the area corresponding to the main display area ARb.

Further, in the above, although considered as part of the configuration that performs image display which comprises the transmissive display panel and the surface light source, this invention is not limited to this. For examples, the display pixels of a display panel which comprises LEDs, such as organic EL devices, LEDs and the like; the display pixels of a self-luminescence type display panel arranged in a matrix form which do not comprise a surface light source and it can be made to apply to a configuration which displays images only with a display panel.

In this case, as the luminosity setting means, it is based on the difference of the transmittance in the above-stated top gate wiring area AWt, the image pick-up area ARf and the dummy area ARd. The luminescent luminosity of the LED display pixels arranged in the equivalent location of the display panel can be controlled. It can be made to apply to a configuration controlled so that the luminescent luminosity of the LEDs of the area corresponding to the sub-display area ARa becomes higher relative to the LEDs of the area corresponding to the main display area ARb. In this case, since the image display operation and image reading operation which were mentioned above are performed by radiated light from a display panel which does not comprise a surface light source, while being able to thin-shaped further the thickness of the entire image reading system containing a display panel, a control circuit, a power supply unit and the like for carrying out luminescent drive control of the surface light source which can be omitted, a still more miniaturized and power-saving device can be attained.

By these configurations, the luminosity in the sub-display area ARa is improved; the lowering of the visibility of the information displayed on the sub-display area ARa is suppressed; and it is designed for the luminosity of the image display area ARi to constitute approximate uniformity overall. While being to acquire satisfactory display quality throughout the image display area ARi, detectable object images, such as a fingerprint, can be read.

<<A Personal Authentication System Using the Image Reading System>>

Next, in the electronic device mounted with the image reading system of each embodiment related to this invention stated above, a personal authentication system constituted using the aforementioned image reading system will be explained with reference to the drawings.

Figure 12:
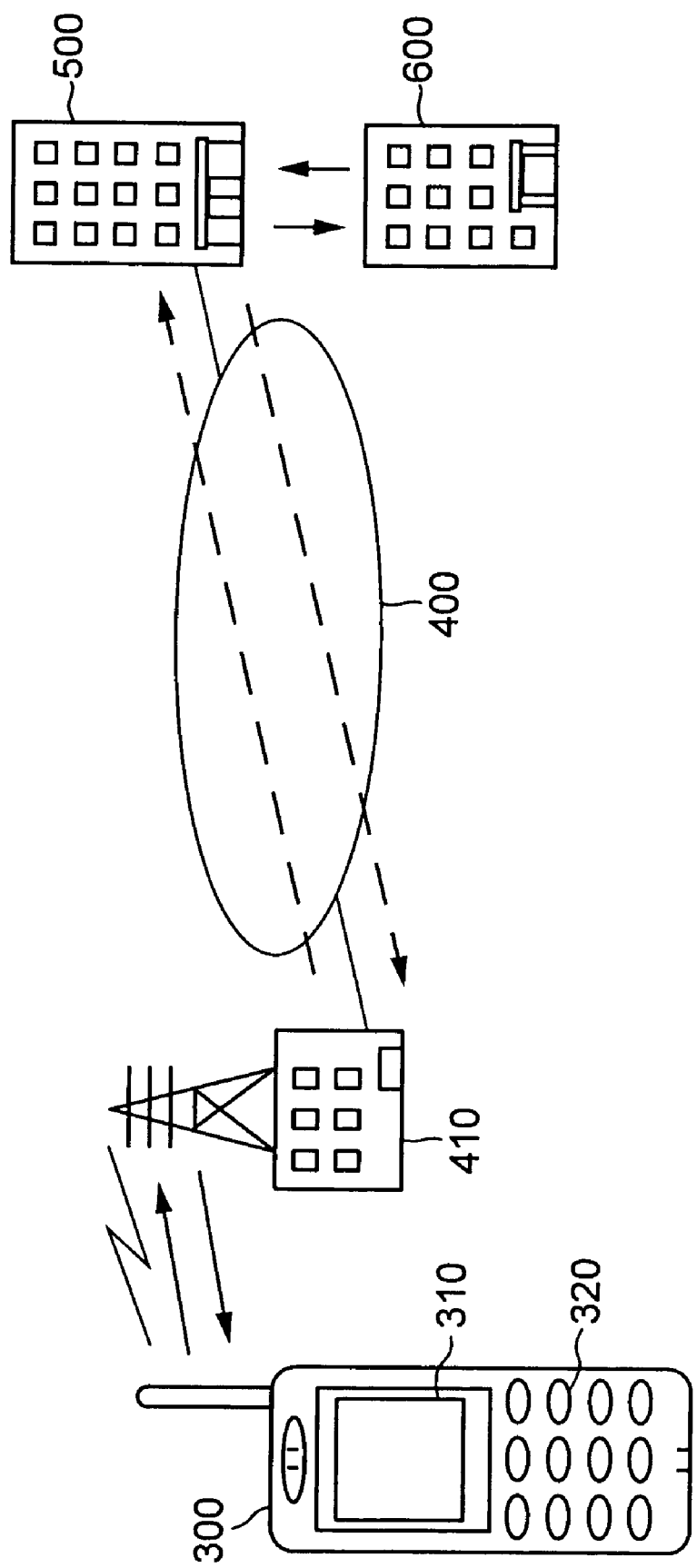
FIG. 12 is a conceptual diagram showing an embodiment of the personal authentication system using the image reading system related to this invention.

FIG. 12 is a conceptual diagram showing an embodiment of the personal authentication system using the image reading system related to this invention.

As shown in FIG. 12, the personal authentication system related to this embodiment, for example, comprises an electronic device 300, a network 400, an access point 410, a service delivery provider 500 and a personal authentication center 600. The image reading system is constituted in each of the embodiments mentioned above mounted in the electronic device 300 illustrating the access point 410 at the time the electronic device 300 connects to the network 400; the network (telecommunication circuit network) 400 where the electronic device 300 is connected via the access point 410; the service delivery provider 500 who is connected to the network 400 and provides predetermined contents service according to requested information and the like from the above-stated electronic device 300; the personal authentication center 600 (authenticating means) which receives the request from the service delivery provider 500 and authenticates the individual person of the electronic device 300.

Here, the electronic device 300 is mounted with a display panel 310 which comprises the image (fingerprint) reading feature equivalent to the image reading system in each of the embodiments mentioned above. Information is provided by a predetermined control signal and/or the predetermined service delivery provider 500 via the network 400, such as images, alphanumeric characters and the like. Furthermore, it has a telecommunication facility section (communication means) which transmits and receives fingerprint data (equivalent to the light and dark information of the detectable object image) read by the fingerprint reader of the display panel 310.

Here, in addition to the above-mentioned telecommunication facility section, the electronic device 300 may be comprised with a personal authentication means to identify and authenticate whether or not the holder of the aforementioned electronic device 300 has previously registered as the user of the electronic device 300. Namely, the holder of the aforementioned fingerprint based on the fingerprint data read by the fingerprint reader.

In this embodiment, although small portable devices, such as cellular/mobile phones and Personal Digital Assistants (PDA) and the like are shown and explained as an example of the electronic device 300, this invention is not limited to this. If the device is an information terminal based on conditional utilization (authorization) by a specific individual, it is similarly applicable, such as a desktop personal computer and the like.

The network 400 is a telecommunication circuit network connectable via the access point 410 using the telecommunication facility of the above-stated electronic device 300. However, the present invention can also be applied to public circuit networks, such as the Internet using well-known general purpose telecommunication circuit networks, for example, cable communications, wireless communications and the like; to telecommunication lines, such as Local Area Networks (LANs) and Wide Area Networks (WANs); and to specific private telecommunication complex of lines separated from a telecommunication circuit network of the above-mentioned general purpose, such as fiber optic networks, Community Access Television (CATV formerly Community Antenna Television) circuit networks, and the like.

The service delivery provider 500 is connected to the above-mentioned network 400. While transmitting predetermined image information and alphanumeric information (for example, contents service provided Internet shopping information and the like) according to the requested information transmitted via the network 400 from the electronic device 300, the fingerprint data transmitted from the electronic device 300 is received and transmitted to a personal authentication center 600 and requests authentication of an individual person. The user of the aforementioned electronic device 300 is then determined based on the authentication result and a user-specific service, such as electronic banking, is provided.

The personal authentication center 600, for example, comprises an accumulated database of previously registered user-specific information (various personal information containing fingerprint data) of the above-mentioned electronic device 300. The fingerprint data which is transmitted from the above-mentioned electronic device 300 from which an authentication request is accomplished by the service delivery provider 500. It is determined whether or not the information requested in the above-mentioned database is in agreement. The personal authentication processing which identifies and authenticates the user of the electronic device 300 is performed. The authentication result is then transmitted to the service delivery provider 500. The personal authentication center 600 may be connected via the service delivery provider 500 and the above-stated network 400, as well as may connect via a private telecommunication complex of lines.

Furthermore, the personal authentication processing which the personal authentication center 600 performs, the service delivery provider 500 may be performed in the interior portion and described later.

Subsequently an example of the authentication process in the personal authentication system which has a configuration mentioned above will be explained with reference to the drawings.

Figure 13:
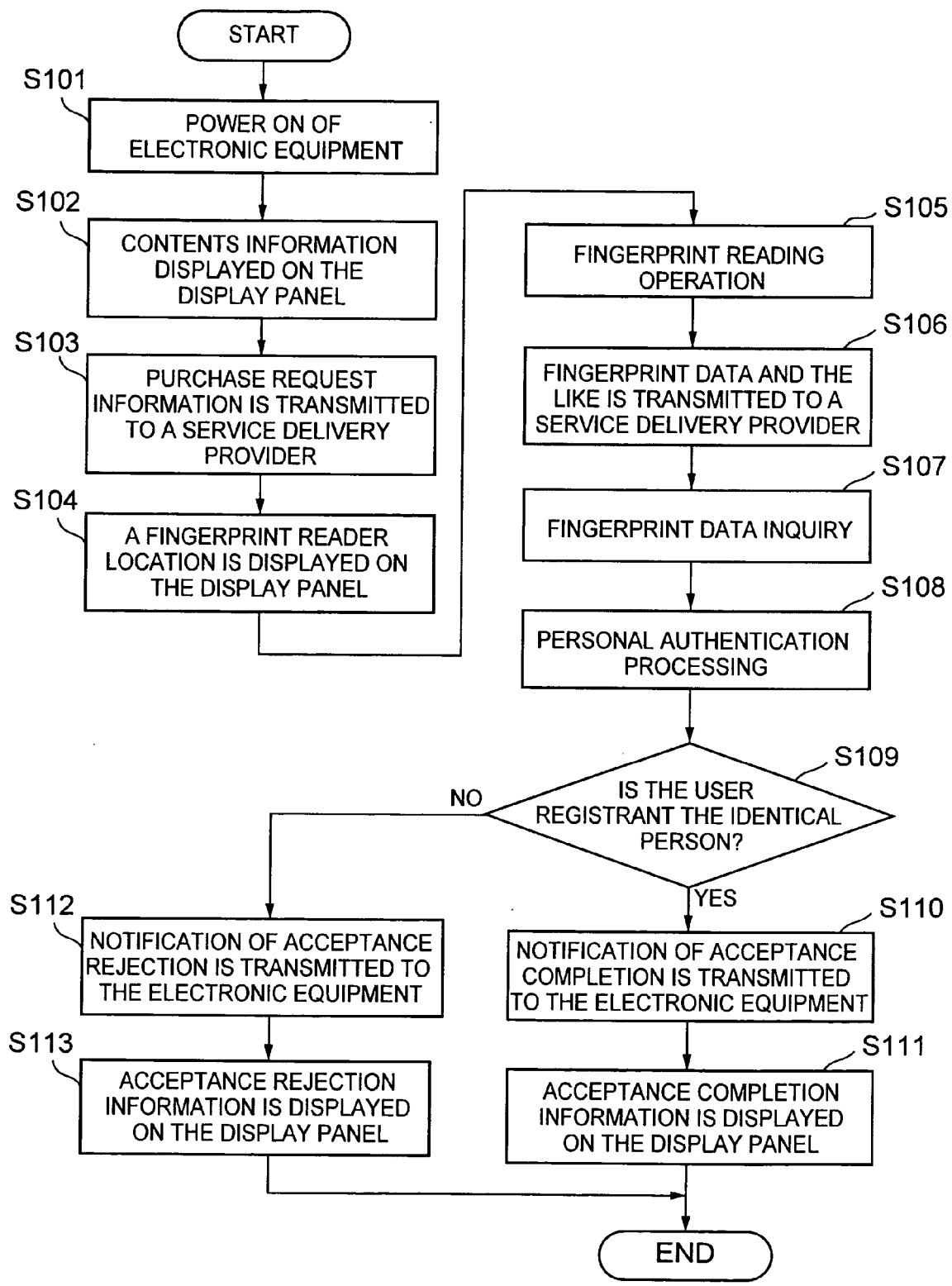
FIG. 13 is a flow chart in the personal authentication system using the image reading system related to this invention which illustrates an example of the authentication process.

FIG. 13 is a flow chart in the personal authentication system using the image reading system related to this invention which illustrates an example of the authentication process.

Figure 14A:
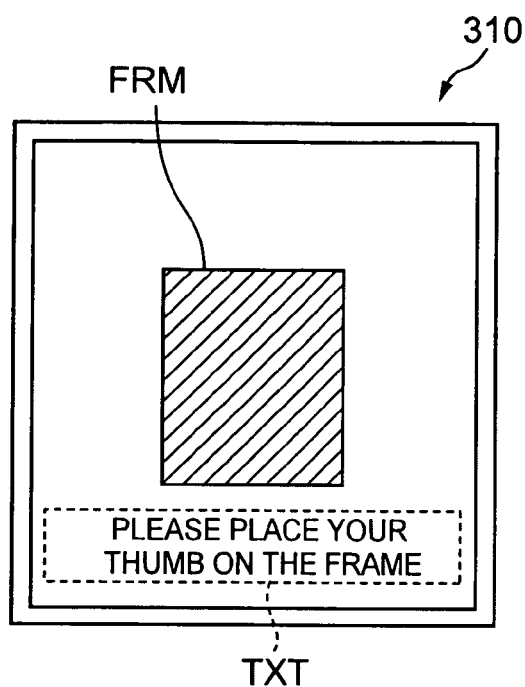
FIGS. 14A and 14B are schematic diagrams of the personal authentication system using the image reading system related to this invention showing an example of the fingerprint reading operation.
Figure 14B:
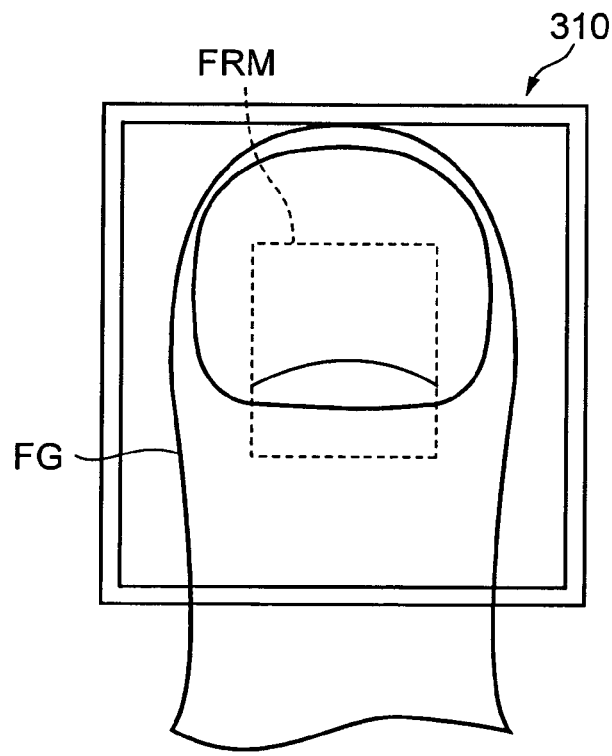

FIGS. 14A and 14B are schematic diagrams of the personal authentication system using the image reading system related to this invention showing an example of the fingerprint reading operation.

Here, in the case where contents, merchandise and the like which a service delivery provider supplies are purchased using the personal identification system by which the user of the electronic device having the configuration mentioned above will be explained.

As shown in FIG. 13, the personal authentication system related to the embodiments, first, when the user of the electronic device 300 performs an "ON" actuation of the power switch, the power supply is switched on and each feature of the electronic device 300 starts (Step S101).

Secondly, by manipulating the appropriate operation keys 320 (See FIG. 12) and the like, the contents information from the service delivery provider 500 is received by the telecommunication facility section via the network 400 and displayed on the display panel 310 in images or alphanumeric characters (Step S102).

Subsequently, the contents, merchandise and the like which the user wishes to have are selected from the variety of information displayed on the aforesaid display, and the purchase request information is transmitted to the service delivery provider 500 via the network 400 (Step S103).

The service delivery provider will transmit the information regarding the purchase request, and when the purchase request information is received, a purchaser information entry screen, for example, as shown in FIG. 14A, will display in the display panel 310 of the electronic device 300. The fingerprint reader location FRM (equivalent to the image pick-up area ARf mentioned above) for acquiring the fingerprint data used for the personal authentication processing to confirm at least an individual person (the user who is the purchase applicant) and the alphanumeric text TXT for guiding the fingerprint reading operation are displayed (Step S104).

Next, the user based on the display of the display panel 310, as shown in FIG. 14B, a finger FG is placed on the fingerprint reading location FRM. Then, by the image reading device arranged on the front face of the display panel 310, the fingerprint image of the finger FG placed on the fingerprint reading location FRM is read and the fingerprint data (light and dark information) is generated (Step S105).

Subsequently, the purchaser information and fingerprint data are enciphered to the service delivery provider 500 and transmitted via the network 400 (Step S106).

Soon after the service delivery provider 500 refers the purchaser information and fingerprint data received to the personal authentication center 600 (Step S107).

Then, the personal authentication center 600 compares the personal information (fingerprint data is included) previously registered with the aforesaid purchaser information and fingerprint data. Next, the personal authentication processing of the user (purchase applicant) by who holds the concerned fingerprint and judges whether or not the person has previously registered (Step S108). The service delivery provider 500 is notified of the authentication result.

The service delivery provider 500, when a user is identified as the correct individual person based on the authentication result regarding the user from the personal authentication center 600 (Step S109), notification of request acceptance completion is transmitted to the electronic device 300 via the network 400 (Step S110), and the acceptance completion information concerned is displayed (Step S111). At this time, the service delivery provider 500, while commencing the browsing of contents and-or download used as the object for purchase are permitted or arranging the shipment of merchandise and the like, a notification request of the debit payment of the purchase price is forward via a financial institution.

Conversely, when the individual person is identified as not the user, a notification of acceptance rejection is transmitted to the electronic device 300 via the network 400 (Step S112), and the acceptance rejection information concerned is displayed (Step S113).

Thus, because the personal authentication system using the image reading system concerning the present invention has a configuration with a permeated type image reading device (photosensor array) arranged on the front face of the display panel, the image (fingerprint) reading location, namely the placement location of a finger, is directly displayed and exceptionally convenient when personal authentication, such as Internet shopping and the like, is required. This is in addition to be able to create this system in a thin-shaped, lightweight electronic device. Furthermore, the fingerprint reading operation can be guided, the fingerprint data can certainly be acquired in a satisfactory state and a personal authentication system with high authentication accuracy can be realized.

Additionally, in the aforementioned embodiments, although the electronic device mounted with the image reading system (fingerprint reader) was used and only in the case where contents, merchandise and the like purchased via networks, such as the Internet, were explained, this invention is not restricted to this. For example, when used in the case where specific information of a business organization is accessed via a leased circuit, specific content which requires membership registration and the like can be applied satisfactorily. In this case, the authentication process is performed in an authentication server (equivalent to the personal authentication center mentioned above) by which the fingerprint data of the user is transmitted from an electronic device and provided to a business connection point or within a service delivery provider.

In each of the aforesaid embodiment, in order to perform personal authentication processing, only the case where it targeted a fingerprint was explained as personal information read by the image reading system related to the present invention, but this invention is not limited to this and can be varied information inherent to a user such as an individual person's biological information as the reading object.

While the present invention has been described with reference to the preferred embodiments, it is intended that the invention be not limited by any of the details of the description thereof.

As this invention can be embodied in several forms without departing from the spirit of the essential characteristics thereof, the present embodiments are therefore illustrative and not restrictive, since the scope of the invention is defined by the appended claims rather than by the description preceding them, and all changes that fall within meets and bounds of the claims, or equivalence of such meets and bounds thereof are intended to be embraced by the claims.

What is claimed is:

1. An image reading system which reads images comprising:
    an image display device which has an image display area to display images having luminosity corresponding to a display gradation and radiates a display illumination according to the luminosity;
    an image reading device arranged on the image display area of the image display device, and wherein the entire image display area is at least covered with a laminated layer arrangement, and comprising:
    a detection surface on which a detectable object is placed;
    a first sub-area in the detection surface on which the detectable object is placed and a second sub-area which includes an area corresponding to at least a portion of the image display area except for the first sub-area; and
    a plurality of photosensors arranged in a matrix form provided in the first sub-area and second sub-area which have permeability, wherein at least a portion of the display illumination radiated from the image display area is permeated and the image of the detectable object is read in the first sub-area.

2. The image reading system according to claim 1, wherein the plurality of photosensors include first photosensors provided in the first sub-area of the detection surface and second photosensors provided in the second sub-area of the detection surface; and
    wherein the first photosensors and the second photosensors have the same structure and the same array interval.

3. The image reading system according to claim 2, wherein the image reading device further comprises a driver circuit which applies predetermined signal voltage to a plurality of photosensors; and
    wherein the driver circuit applies and drives the predetermined signal voltage to only the first photosensors in the first sub-area of the detection surface.

4. The image reading system according to claim 1, wherein the image display device comprises a setting device which sets the luminosity of the area corresponding to at least the first sub-area in the image display area at a luminosity suitable for reading the detectable object image in the photosensor array.

5. The image reading system according to claim 1, wherein the image display device comprises:
    a luminescent device which has an area corresponding to at least the image display area and has a luminescent surface side which radiates light in a predetermined luminosity; and
    a transmissive display panel which is placed on the luminescent surface of the luminescent device, and wherein the image display area of the image display device is arranged with a plurality of display pixels formed in a matrix form whereby at least a portion of the light radiated from the luminescent surface of the luminescent device in the image display area is permeated and radiates as the display illumination.

6. The image reading system according to claim 5, wherein the display pixels in the image display device have liquid crystal pixel cells.

7. The image reading system according to claim 1, wherein the image display device comprises a self-luminescence type display panel; and
    wherein the image display area includes a plurality of display pixels arranged and formed in a matrix form and have luminescent pixels which radiate the display illumination in a luminescent luminosity responsive to the display gradation.

8. The image reading system according to claim 7, wherein the luminescent pixels of the display pixels have organic electroluminescent devices.

9. The image reading system according to claim 1, wherein the detectable object is a human body, and wherein the image reading device reads an image pattern distinctive to the human body.

10. The image reading system according to claim 9, wherein the detectable object is a finger, and wherein the detectable object image includes a fingerprint image.

11. The image reading system according to claim 1, wherein the photosensors receive light which is at least a portion of the light of the display illumination which is permeated by the photosensors and is irradiated by the detectable object placed on the detection surface and is reflected by the detectable object, and read the detectable object image.

12. The image reading system according to claim 1, wherein the photosensors have a Thin-Film Transistor structure.

13. The image reading system according to claim 12, wherein the photosensors have a substrate which has permeability; and
    wherein the Thin-Film Transistor structure includes:
        a source electrode and a drain electrode which comprise an electrode material which has permeability formed across a channel region of a semiconductor layer on the substrate;
        a first gate electrode which comprises an electrode material having permeability formed through an insulator layer which has permeability in upper and lower parts of the channel region; and
        a second gate electrode which comprises an electrode material which has a light shielding characteristic.

14. The image reading system according to claim 13, wherein the photosensors, after a reset pulse is applied and initialized by the first gate electrode, store an electric charge according to the amount of light by which incidence is performed to the channel region, in the channel region; and wherein:
    after a precharge pulse is applied to the drain electrode, the stored electric charge is read-out to the second gate electrode after a predetermined charge storage period elapses from the time of the initialization completion and a pulse is applied;
    a voltage corresponding to the amount of charge stored in the channel region during the charge storage period is outputted as output voltage; and
    the image reading device detects a difference between the signal voltage and the output voltage in relation to the precharge pulse as light and dark information.

15. The image reading system according to claim 1, wherein the image reading device comprises a third sub-area which includes a wiring area where only a plurality of electrical wires are connected to the photosensors in the first sub-area, the third sub-area comprising an area except for the first sub-area and the second sub-area arranged in the detection surface.

16. The image reading system according to claim 15, wherein the image display device comprises a luminosity setting device which sets low luminosity in an area corresponding to at least the third sub-area in the detection surface of the image display area to the luminosity of the area corresponding to the first sub-area and the second sub-area.

17. The image reading system according to claim 16, wherein a wiring area is provided in the area of the third sub-area, and wherein:
the luminosity setting device further sets a low luminosity in areas corresponding to the sub-areas except for the wiring area of the third sub-area of the image display area to the luminosity of the area corresponding to the wiring area.

18. The image reading system according to claim 16, wherein the display device comprises:
a luminescent device which has a region corresponding to at least the image display area and has a luminescent surface side which radiates light in a predetermined luminosity; and
a transmissive display panel which is placed on the luminescent surface of the luminescent device, and wherein the image display area is arranged with a plurality of display pixels formed in a matrix form whereby at least a portion of light radiated from the luminescent surface of the luminescent device in the image display area is permeated and radiates as the display illumination; and wherein
the luminosity setting device further sets a low luminosity in an area corresponding to at least the third sub-area of the luminescent surface of the luminescent device to the luminosity of the areas corresponding to the first sub-area and the second sub-area.

19. The image reading system according to claim 18, wherein the display pixels have liquid crystal pixel cells.

20. The image reading system according to claim 18, wherein:
the luminescent device comprises a plurality of light emitting devices which radiate the irradiated light and which are arranged in a matrix form in the luminescent surface; and
the luminosity setting device sets a low luminosity in the light emitting devices arranged in the area corresponding to at least the third sub-area of the luminescent device to the luminosity of the light emitting devices corresponding to the first sub-area and the second sub-area.

21. The image reading system according to claim 20, wherein the light emitting devices have organic electroluminescent devices.

22. The image reading system according to claim 16, wherein:
the image display device comprises a self-luminescence type display panel which has a plurality of display pixels having luminescent pixels that radiate the display illumination light in a predetermined luminosity;
the plurality of display pixels are arranged in a matrix form and are formed in the image display area; and
the luminosity setting device sets a low luminosity in display pixels in the area corresponding to at least the third sub-area of the image display area in the display panel to the luminosity of the luminescent pixels of the display pixels in the areas corresponding to the first sub-area and the second sub-area.

23. The image reading system according to claim 22, wherein the luminescent pixels of the display pixels have organic electroluminescent devices.

24. A drive method of an image reading system which reads images, wherein:
the image reading system comprising an image display device which comprises an image display area which displays images having luminosity corresponding to a display gradation and radiates a display illumination according to the luminosity; and an image reading device arranged on the display area of the image display device, and wherein the entire image display area is at least covered with a laminated layer arrangement and a detection surface on which a detectable object is placed; and a plurality of photosensors arranged in a first sub-area in the detection surface on which the detectable object is placed and a second sub-area which includes an area corresponding to at least a portion of the image display area except for the first sub-area and permeate at least a portion of the display illumination;
the method of operation in a case of reading an image of the detectable object placed on the detection surface with the image display device, comprising:
a step of receiving light that is at least a portion of the display illumination light permeated by the photosensors and which is irradiated by the detectable object placed on the detection surface and is reflected by the detectable object with the photosensors of the first sub-area of the detection surface; and
a step of reading the image of the detectable object as light and dark information based on the luminosity intensity distribution received by the photosensors.

25. The drive method of the image reading system according to claim 24, which comprises a step of setting the luminosity of the area corresponding to at least the first sub-area of the image display area at a luminosity suitable for reading a photographic image.

26. The drive method of the image reading system according to claim 24, which comprises a step of performing a display for guiding a placement of the detectable object to the first sub-area of the detection surface in the image display area of the image display device.

27. The drive method of the image reading system according to claim 24, further comprising displaying an image through the image reading device, comprising:
setting each photosensor in the image reading device to a non-operating state; and
applying a the signal voltage according to the display gradation to each display pixel in the image display area of the image display device and displaying the image.

28. A personal authentication system which authenticates an individual by reading a detectable object image based on individual biological information, comprising:
an image display device which has an image display area to display images having luminosity corresponding to a display gradation and radiates a display illumination according to the luminosity;
an image reading system which comprises an image reading device comprising a detection surface on which a detectable object is to be placed, wherein the entire image display area of the image display device is at least covered with a laminated layer arrangement and at least a portion of the display illumination is permeated;
a plurality of photosensors provided in a first sub-area in the detection surface on which the detectable object is to be placed and a second sub-area which includes an area corresponding to at least a portion of the image display area except for the first sub-area; and wherein a photographic image of the detectable object is read in the first sub-area;

a communication system including a transmitter which transmits at least light and dark information on the detectable object read by the image reading device to an authenticating device through a predetermined telecommunication circuit network, and a receiver which receives a result of an authentication process, whereby registration information previously recorded by the authenticating device and the light and dark information are compared through a telecommunication circuit network; and a display device which displays at least the result of the authentication process with the image display device.

29. The personal authentication system according to claim 28, wherein the detectable object is a finger and the detectable object image is a fingerprint image.

30. The personal authentication system according to claim 28, further comprising a guide for guiding a placement of the detectable object in the first sub-area of the detection surface of the image display device.

31. The personal authentication system according to claim 28, wherein the plurality of photosensors comprise the first photosensors provided in the first sub-area of the detection surface and the second photosensors provided in the second sub-area of the detection surface; and wherein the first photosensors and the second photosensors have a same structure and a same array interval.

32. The personal authentication system according to claim 28, wherein the photosensors receive light which is at least a portion of the light of the display illumination permeated by the photosensors and is irradiated by the detectable object placed on the detection surface and is reflected by the detectable object and reads the detectable object image.

33. The personal authentication system according to claim 28, wherein the photosensors have a Thin-Film Transistor structure.

34. The personal authentication system according to claim 33, wherein:

the photosensors have a substrate which has permeability; and wherein the Thin-Film Transistor structure includes:

a source electrode and a drain electrode which comprise an electrode material which has permeability formed across a channel region of a semiconductor layer on the substrate;

a first gate electrode which comprises an electrode material having permeability formed through an insulator layer which has permeability in upper and lower parts of the channel region; and a second gate electrode which comprises an electrode material which has a light shielding characteristic;

and wherein:

after a reset pulse is applied and initialized by the first gate electrode, an electric charge according to the amount of light by which incidence is performed to the channel region is stored in the channel region;

after a precharge pulse is applied to the drain electrode, a read-out is applied to the second gate electrode after a predetermined charge storage period elapses from the time of the initialization completion;

a voltage corresponding to the amount of charge stored in the channel region during the charge storage period is outputted as output voltage; and the image reading system detects a difference between the signal voltage and the output voltage in relation to the precharge pulse as light and dark information.

35. An authenticating method in a personal authentication system which authenticates an individual with a detectable object image by reading the detectable object image based on individual biological information, wherein the personal authentication system comprises:

an image display device which has an image display area to display images that radiate a display illumination according to a display gradation;

a detection surface on which a detectable object is to be placed in the image display area of the image display device and wherein the entire image display area is at least covered with a laminated layer arrangement;

an image reading device which has a plurality of photosensors provided in a first sub-area in the detection surface on which the detectable object is to be placed and a second sub-area which includes an area corresponding to at least a portion of the image display area except for the first sub-area, and permeates at least a portion of the display illumination; and a communications system which both at least transmits light and dark information on the detectable object image from the image reading device and receives information regarding an authentication process relating to the light and dark information;

and wherein the method comprises:

a step of receiving light that is at least a portion of the display illumination light permeated by the photosensors and is irradiated by the detectable object placed on the detection surface and is reflected by the detectable object with the photosensors of the first sub-area of the detection surface;

a step of reading an image of the detectable object as light and dark information based on the luminosity intensity distribution received by the photosensors;

a step of transmitting to an authenticating device the light and dark information by the communication system through a predetermined telecommunication circuit network;

a step of comparing registration information previously recorded by the authenticating device and the light and dark information, and performing an authentication process;

a step of receiving a result of the authentication process by the communications system through a telecommunication circuit network; and a step of displaying at least the result of the authentication process.

36. The authentication method in the personal authentication system according to claim 35, wherein the detectable object is a finger and the detectable object image is a fingerprint image.

37. The authentication method of the personal authentication system according to claim 35, further comprising setting the luminosity of an area corresponding to at least the first sub-area of the image display area at a luminosity suitable for reading the detectable object image.

38. The authentication method in the personal authentication system according to claim 35, further comprising guiding a placement of a detectable object to the first sub-area of the detection surface in the image display area of the image display device.

* * * * *